US012591314B2

(12) United States Patent
Ido

(10) Patent No.: US 12,591,314 B2
(45) Date of Patent: Mar. 31, 2026

(54) PROCESSING DEVICE, TERMINAL DEVICE, METHOD FOR DETERMINING INPUT DEVICE, AND METHOD FOR DISPLAYING INPUT SCREEN

(71) Applicant: SHARP KABUSHIKI KAISHA, Sakai City (JP)

(72) Inventor: Kazuhiko Ido, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 9 days.

(21) Appl. No.: 18/126,758

(22) Filed: Mar. 27, 2023

(65) Prior Publication Data

US 2023/0315215 A1     Oct. 5, 2023

(30) Foreign Application Priority Data

Apr. 1, 2022     (JP) ................................. 2022-062041

(51) Int. Cl.
| | |
|---|---|
| *G06F 3/02* | (2006.01) |
| *G06F 3/04886* | (2022.01) |
| *H04N 1/00* | (2006.01) |

(52) U.S. Cl.
CPC ........ *G06F 3/0219* (2013.01); *G06F 3/04886* (2013.01); *H04N 1/00384* (2013.01)

(58) Field of Classification Search
CPC .... G06F 3/0219; G06F 3/04886; G06F 3/023; G06F 1/16–169; G06F 3/00; G06F 3/01; G06F 3/02–0238; G06F 3/0488; G06F 3/0482; G06F 3/0354; G06F 3/041; G06F 3/044; G06F 3/038; G06F 3/14; G06F 3/0426; G06F 3/0489; G06F 3/04895;

G06F 9/00; G06F 13/00; G06F 13/38; G06F 15/00; G06F 15/02; G06F 15/0225; G06F 17/00; G06F 21/00; G06F 21/44; G06F 21/83; H04N 1/00384; H04N 1/00; H03M 11/00; H04Q 1/00
USPC ........................................ 345/156, 168, 173
See application file for complete search history.

(56) References Cited

U.S. PATENT DOCUMENTS

| | | | |
|---|---|---|---|
| 6,486,868 B1 * | 11/2002 | Kazarian ............. | G06F 3/03549 345/161 |
| 11,558,375 B1 * | 1/2023 | Cao ........................ | H04L 9/3226 |
| 2006/0179411 A1 * | 8/2006 | Wolf ........................ | G06F 3/023 715/751 |
| 2009/0300757 A1 | 12/2009 | Tanaka et al. | |

(Continued)

FOREIGN PATENT DOCUMENTS

| | | | | |
|---|---|---|---|---|
| JP | 2000207108 | * | 7/2000 | .............. G06F 3/02 |
| JP | 2009-286058 A | | 12/2009 | |
| JP | 2011-234158 A | | 11/2011 | |

*Primary Examiner* — Chanh D Nguyen
*Assistant Examiner* — Nguyen H Truong
(74) *Attorney, Agent, or Firm* — ScienBiziP, P.C.

(57)     ABSTRACT

A processing device includes an inputter capable of accepting input by different input devices, a storage that stores registration information on the input devices, and a controller capable of setting a first input device based on a previously set predetermined setting as the input device from which the input is accepted, and when the controller detects connection of a second input device and determines that the storage stores the registration information on the second input device, the controller sets the second input device as the input device from which the input is accepted.

9 Claims, 21 Drawing Sheets

(56) References Cited

U.S. PATENT DOCUMENTS

| | | | | |
|---|---|---|---|---|
| 2012/0242603 | A1* | 9/2012 | Engelhardt | G06F 21/32 |
| | | | | 345/173 |
| 2014/0106875 | A1* | 4/2014 | Nguyen | G06F 3/0484 |
| | | | | 463/31 |
| 2015/0363994 | A1* | 12/2015 | Nguyen | G07F 17/3251 |
| | | | | 463/31 |
| 2016/0072971 | A1* | 3/2016 | Ozaki | H04N 1/00413 |
| | | | | 358/1.15 |
| 2017/0075641 | A1* | 3/2017 | Kwon | G06F 3/04886 |
| 2017/0131788 | A1* | 5/2017 | Kaku | G06F 3/0233 |
| 2018/0267762 | A1* | 9/2018 | Aurongzeb | G06F 3/042 |
| 2020/0192496 | A1* | 6/2020 | Yamamoto | G06F 3/038 |
| 2020/0304657 | A1* | 9/2020 | Kado | H04N 1/00413 |
| 2020/0371607 | A1* | 11/2020 | Sakamoto | G06F 3/03545 |
| 2021/0165387 | A1* | 6/2021 | Liu | G05D 1/0016 |
| 2022/0164042 | A1* | 5/2022 | Lien | G06F 3/03543 |
| 2022/0311882 | A1* | 9/2022 | Saeda | H04N 1/00973 |
| 2022/0385784 | A1* | 12/2022 | Chiba | H04N 1/00933 |
| 2023/0350476 | A1* | 11/2023 | Shahparnia | G06F 3/0442 |
| 2024/0179257 | A1* | 5/2024 | Nagao | H04N 1/00363 |

* cited by examiner

| REGISTRATION ID | DEVICE ID | KEY LAYOUT | KEYBOARD TYPE | COMMUNICATION TYPE |
|---|---|---|---|---|
| #001 | ggghhhiii | 106/QWERTY | HARDWARE | WIRELESS |
| #002 | jjjkkklll | 101/QWERTZ | HARDWARE | WIRELESS |
| #003 | mmmnnnoo | FLICK | SOFTWARE | WIRELESS |
| #004 | opppqqqrrr | 102/AZERTY | HARDWARE | WIRED |

FIG. 4

| PRIORITY ORDER | DEVICE ID | KEY LAYOUT | KEYBOARD TYPE |
|---|---|---|---|
| 01 | aaabbbccc | 106/QWERTY | HARDWARE |
| 02 | ssstttuuu | — | SOFTWARE (BUILT-IN) |
| 03 | dddeeefff | 101/QWERTZ | HARDWARE |

FIG. 9A

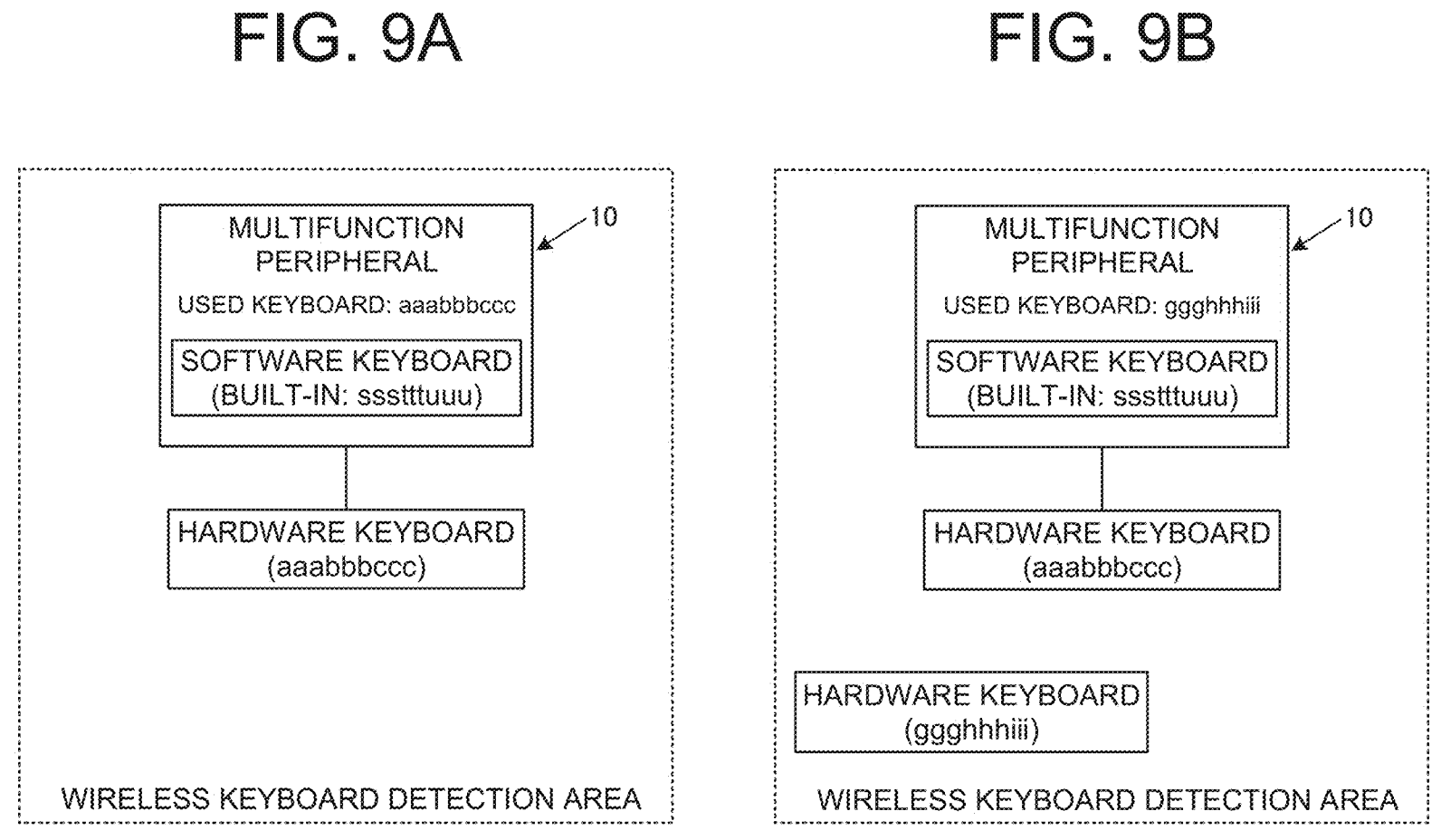

MULTIFUNCTION PERIPHERAL

USED KEYBOARD: aaabbbccc

SOFTWARE KEYBOARD (BUILT-IN: ssstttuuu)

10

HARDWARE KEYBOARD (aaabbbccc)

WIRELESS KEYBOARD DETECTION AREA

FIG. 9B

MULTIFUNCTION PERIPHERAL

USED KEYBOARD: ggghhhiii

SOFTWARE KEYBOARD (BUILT-IN: ssstttuuu)

10

HARDWARE KEYBOARD (aaabbbccc)

HARDWARE KEYBOARD (ggghhhiii)

WIRELESS KEYBOARD DETECTION AREA

FIG. 10B

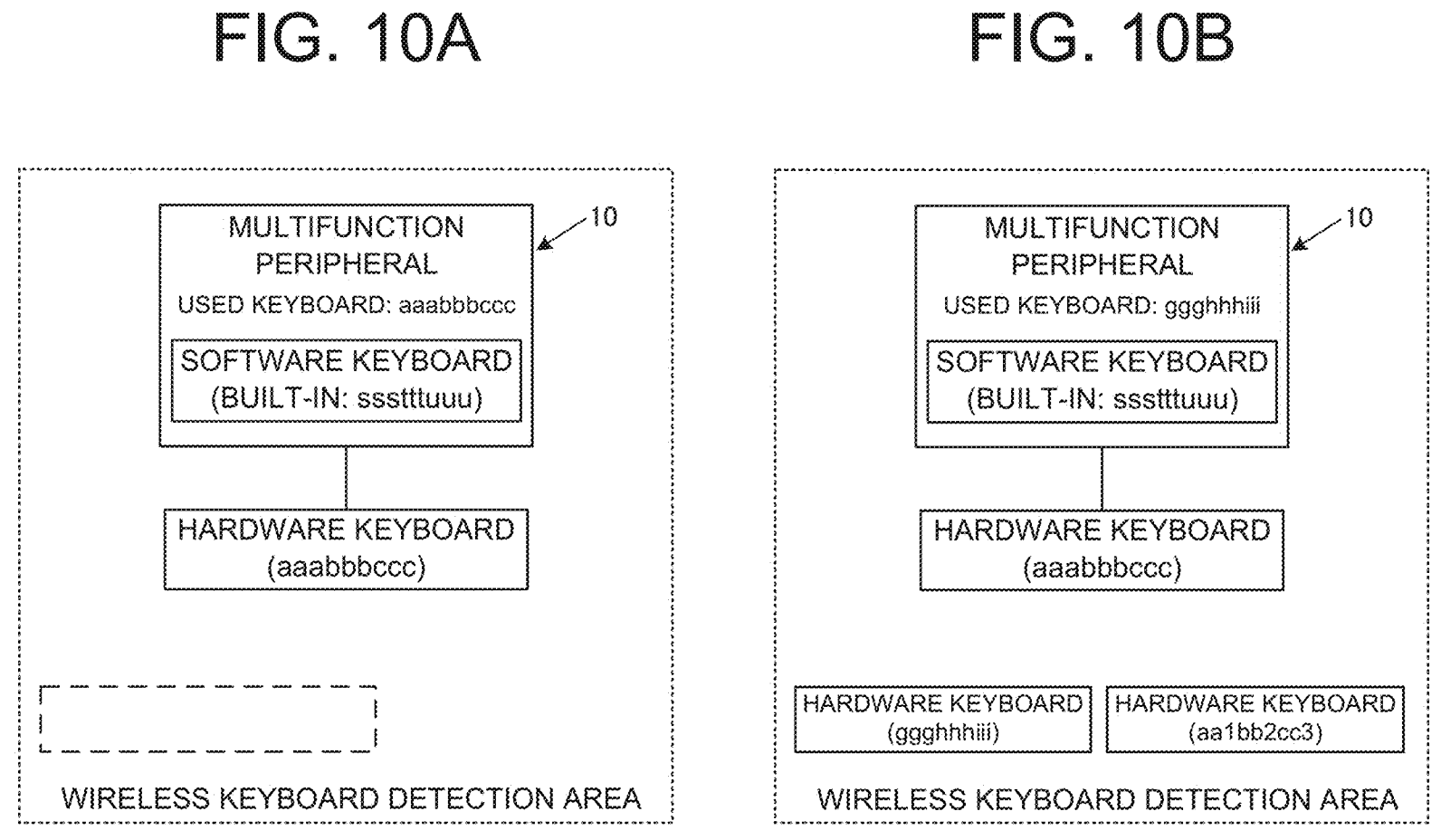

MULTIFUNCTION PERIPHERAL 10

USED KEYBOARD: ggghhhiii

SOFTWARE KEYBOARD (BUILT-IN: sssttuuu)

HARDWARE KEYBOARD (aaabbbccc)

HARDWARE KEYBOARD (ggghhhiii)

HARDWARE KEYBOARD (aa1bb2cc3)

WIRELESS KEYBOARD DETECTION AREA

FIG. 10A

MULTIFUNCTION PERIPHERAL 10

USED KEYBOARD: aaabbbccc

SOFTWARE KEYBOARD (BUILT-IN: sssttuuu)

HARDWARE KEYBOARD (aaabbbccc)

WIRELESS KEYBOARD DETECTION AREA

Figure 17:
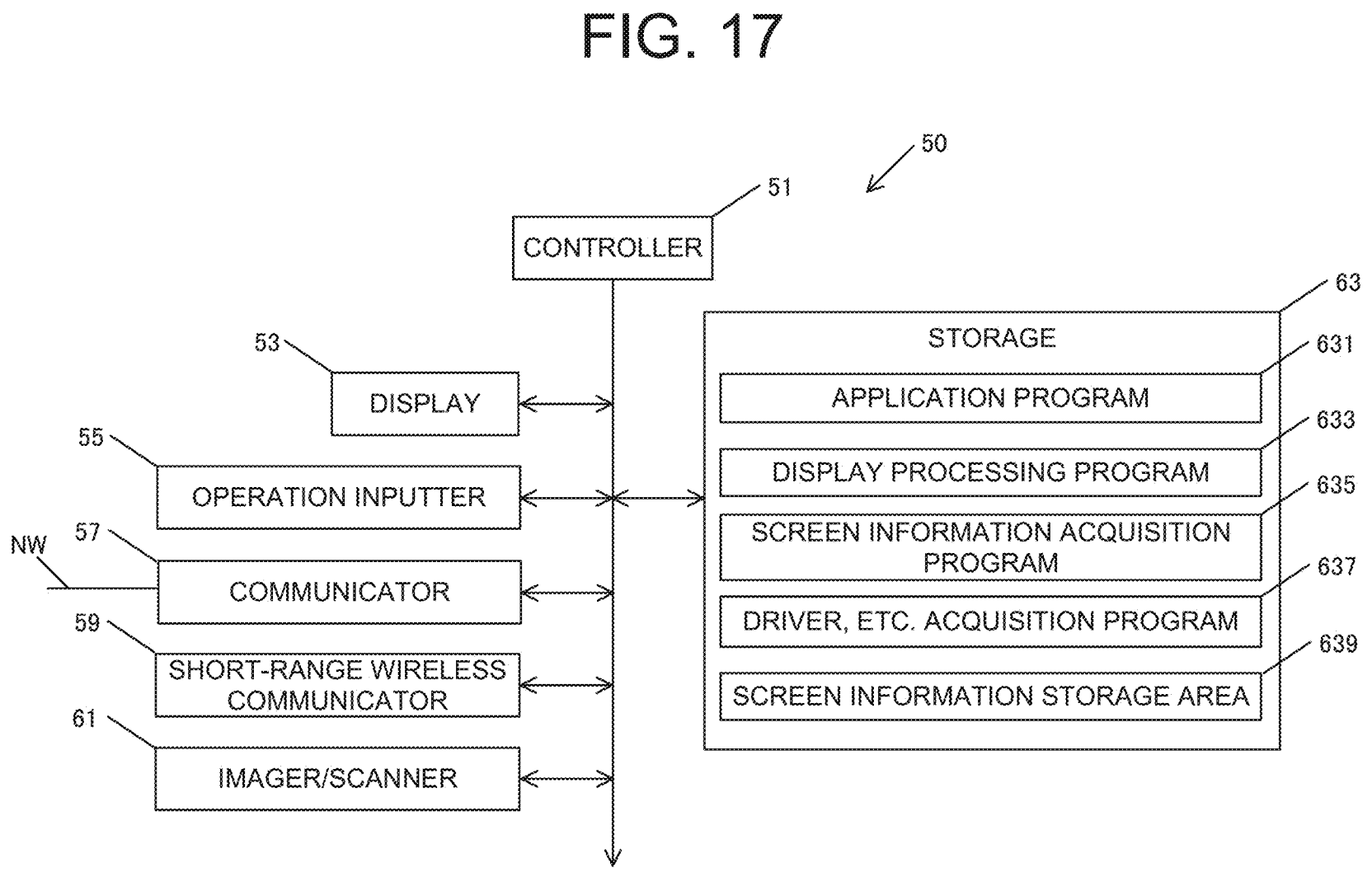

51 CONTROLLER

53 DISPLAY

55 OPERATION INPUTTER

57 COMMUNICATOR

NW

59 SHORT-RANGE WIRELESS COMMUNICATOR

61 IMAGER/SCANNER

63 STORAGE

631 APPLICATION PROGRAM

633 DISPLAY PROCESSING PROGRAM

635 SCREEN INFORMATION ACQUISITION PROGRAM

637 DRIVER, ETC. ACQUISITION PROGRAM

639 SCREEN INFORMATION STORAGE AREA

Figure 21:
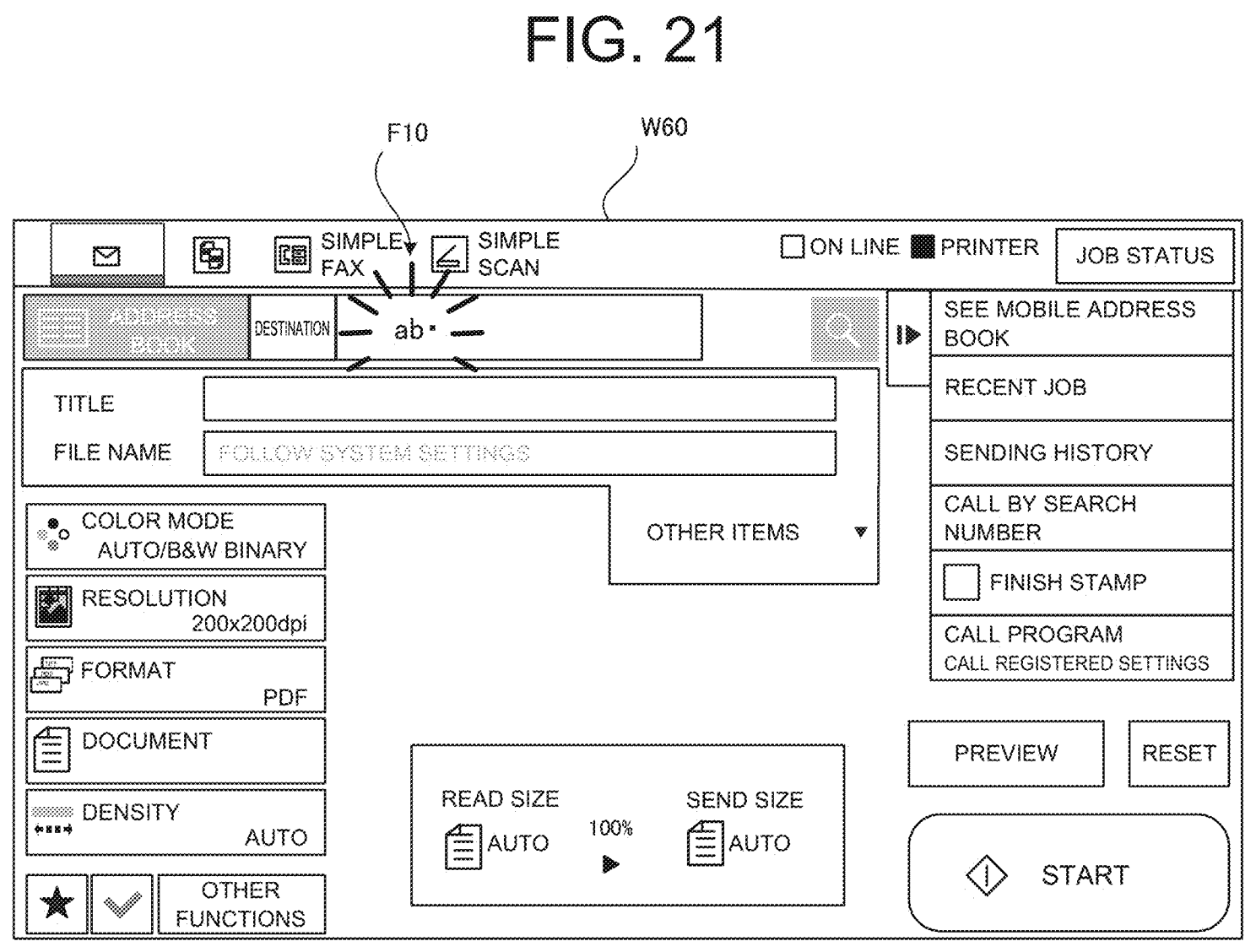

ON LINE  PRINTER  JOB STATUS

SIMPLE FAX    SIMPLE SCAN ab

DESTINATION

SEE MOBILE ADDRESS BOOK

RECENT JOB

SENDING HISTORY

CALL BY SEARCH NUMBER

FINISH STAMP

CALL PROGRAM
CALL REGISTERED SETTINGS

TITLE

FILE NAME

FOLLOW SYSTEM SETTINGS

OTHER ITEMS

COLOR MODE
AUTO/B&W BINARY

RESOLUTION
200x200dpi

FORMAT
PDF

DOCUMENT

DENSITY
AUTO

OTHER FUNCTIONS

READ SIZE
AUTO    100%

SEND SIZE
AUTO

PREVIEW    RESET

START

PROCESSING DEVICE, TERMINAL DEVICE, METHOD FOR DETERMINING INPUT DEVICE, AND METHOD FOR DISPLAYING INPUT SCREEN

BACKGROUND OF THE INVENTION

Field of the Invention

The present disclosure relates to a processing device, and the like.

Description of the Background Art

Keyboards as input devices have a plurality of key layouts including the QWERTY layout used in English-speaking countries such as the United States of America and Japan, the AZERTY layout used in French-speaking countries, and the QWERTZ layout used in German-speaking countries. Terminal devices such as cell phones and smartphones sometimes use the flick layout that allows users to input characters with a flick operation so as to input characters within a limited display area.

In order to be used in various countries and regions, some processing devices such as multifunction peripherals display software keyboards with key layouts corresponding to these countries and regions.

For example, according to a conventional technique, there is a known image-forming apparatus that, when the connection of a device (keyboard) to a multifunction peripheral is detected, acquires and stores the country information stored in a memory of the device and automatically sets the key layout of the software keyboard corresponding to the country of the stored country information.

The availability of hardware keyboards and software keyboards corresponding to a plurality of types of key layouts on the processing device improves convenience for users of the processing device. However, when the user desires to use the keyboard corresponding to the key layout that is normally used by the user, the user needs to perform an operation to select the desired keyboard to be used from the keyboards corresponding to the plurality of types of available key layouts, which may reduce the operability.

The purpose of the present disclosure is to provide a processing device, and the like, which, when the user desires to use the keyboard in the processing device, allows the user to use the keyboard without reducing the operability.

SUMMARY OF THE INVENTION

In order to solve the above issue, a processing device according to the present disclosure includes an inputter capable of accepting input by different input devices, a storage that stores registration information on the input devices, and a controller capable of setting a first input device based on a previously set predetermined setting as the input device from which the input is accepted, and when the controller detects connection of a second input device and determines that the storage stores the registration information on the second input device, the controller sets the second input device as the input device from which the input is accepted.

A terminal device according to the present disclosure includes a display, an acquirer that acquires screen information related to a keyboard operating on a processing device, and a controller that generates an input screen corresponding to the keyboard based on the acquired screen information and displays the input screen on the display.

A method for determining an input device according to the present disclosure includes accepting input by different input devices, storing registration information on the input devices, first setting a first input device based on a previously set predetermined setting as the input device to be used for input in the inputting, and second setting a second input device as the input device to be used for input in the inputting when connection of the second input device is detected and it is determined that the registration information on the second input device is stored in the storing.

A method for displaying an input screen according to the present disclosure includes acquiring screen information related to a keyboard operating on a processing device, and generating an input screen corresponding to the keyboard based on the acquired screen information and displaying the input screen on a display device.

According to the present disclosure, when the user desires to use the keyboard in the image processing device, it is possible to provide the processing device, and the like, which allows the use of the keyboard without reducing the operability.

BRIEF DESCRIPTION OF THE DRAWINGS

FIG. 2 is a diagram illustrating a functional configuration of the multifunction peripheral according to the first embodiment.

FIG. 3 is a table illustrating an example of a structure of a registration information table.

FIG. 4 is a table illustrating an example of a structure of a predetermined setting table.

FIGS. 9A and 9B are diagrams illustrating an operation example according to the first embodiment.

FIGS. 10A and 10B are diagrams illustrating an operation example according to the first embodiment.

FIG. 17 is a diagram illustrating a functional configuration of a terminal device according to the fourth embodiment.

FIG. 20 is a diagram illustrating an operation example according to the fourth embodiment.

FIG. 21 is a diagram illustrating an operation example according to the fourth embodiment.

DESCRIPTION OF THE PREFERRED EMBODIMENTS

Embodiments of the present disclosure will be described below with reference to the drawings. According to the present disclosure, a multifunction peripheral 10 that may execute jobs regarding a copy mode, scan mode, fax mode, and the like, is described as an example of a processing device. The embodiments below are examples for describing the present disclosure, and the technical scope of the description in the claims is not limited to the description below.

1 First Embodiment

The multifunction peripheral 10 according to a first embodiment includes an inputter capable of accepting input by different input devices, a storage that stores registration information on the input devices, and a controller capable of setting a first input device based on a previously set predetermined setting as the input device that provides input to the inputter, and when the controller detects connection of a second input device and determines that the storage stores the registration information on the second input device, the controller switches the input device, which provides input to the inputter, from the first input device to the second input device.

Here, examples of the input device according to the present disclosure may include keyboards with wired connection methods corresponding to key layouts such as QWERTY layout (106/QWERTY), AZERTY layout (102/AZERTY), and QWERTZ layout (101/QWERTZ) (e.g., keyboards compatible with Universal Serial Bus (USB)) and keyboards with wireless connection methods compatible with short-range wireless communication protocols such as Wi-Fi (registered trademark) and Bluetooth (registered trademark). The input device may be a software keyboard that displays a key layout on a display screen included in a terminal device such as a cell phone or smartphone or on a touch panel screen included in the multifunction peripheral 10. There are no particular restrictions as long as the input device according to the present disclosure includes a device controller, driver, device memory, software, and the like, to output characters, commands, and the like, input by the user to the multifunction peripheral 10.

1.1 Functional Configuration

Figure 1:
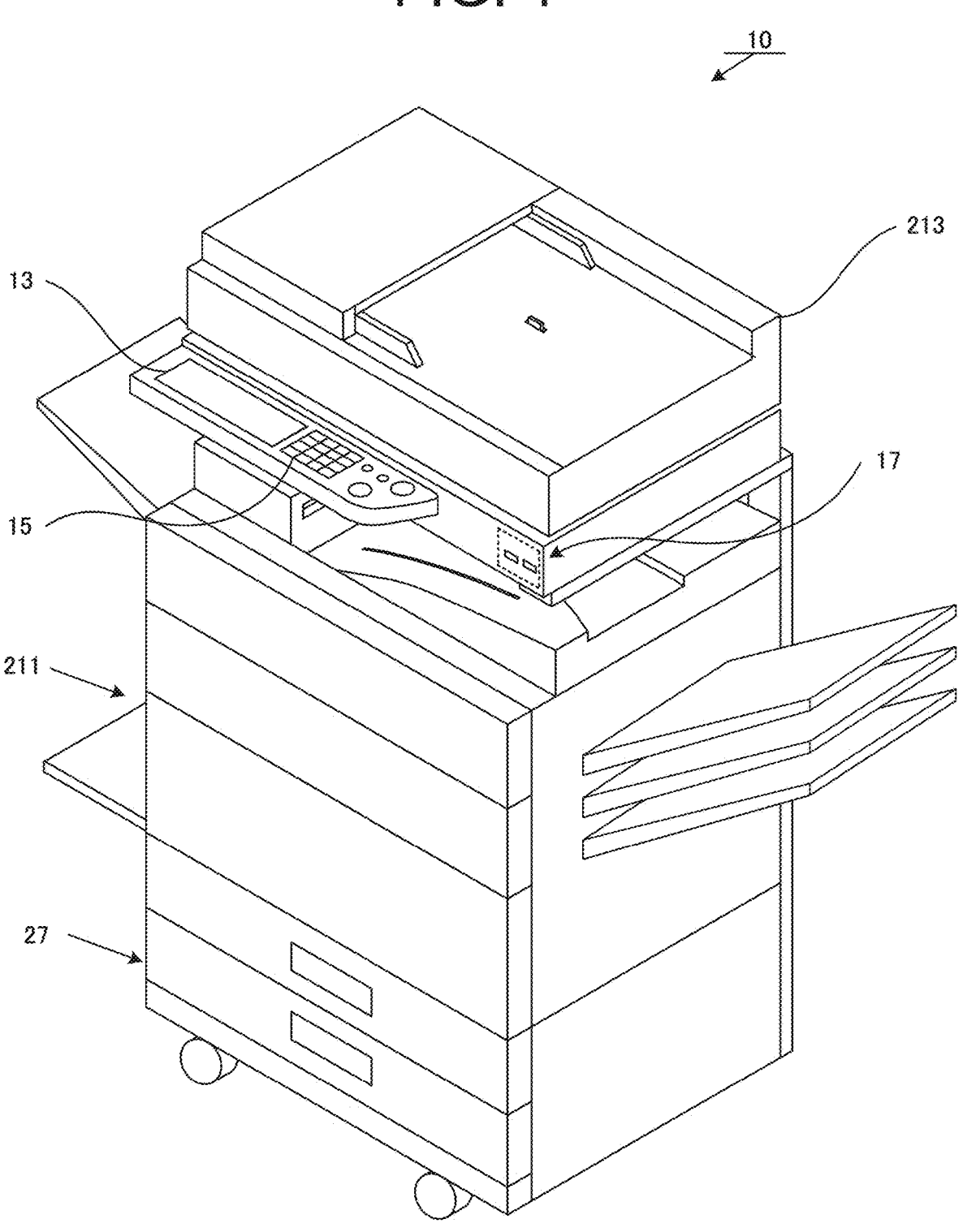
FIG. 1 is a diagram schematically illustrating an overall configuration of a multifunction peripheral according to a first embodiment.
Figure 2:
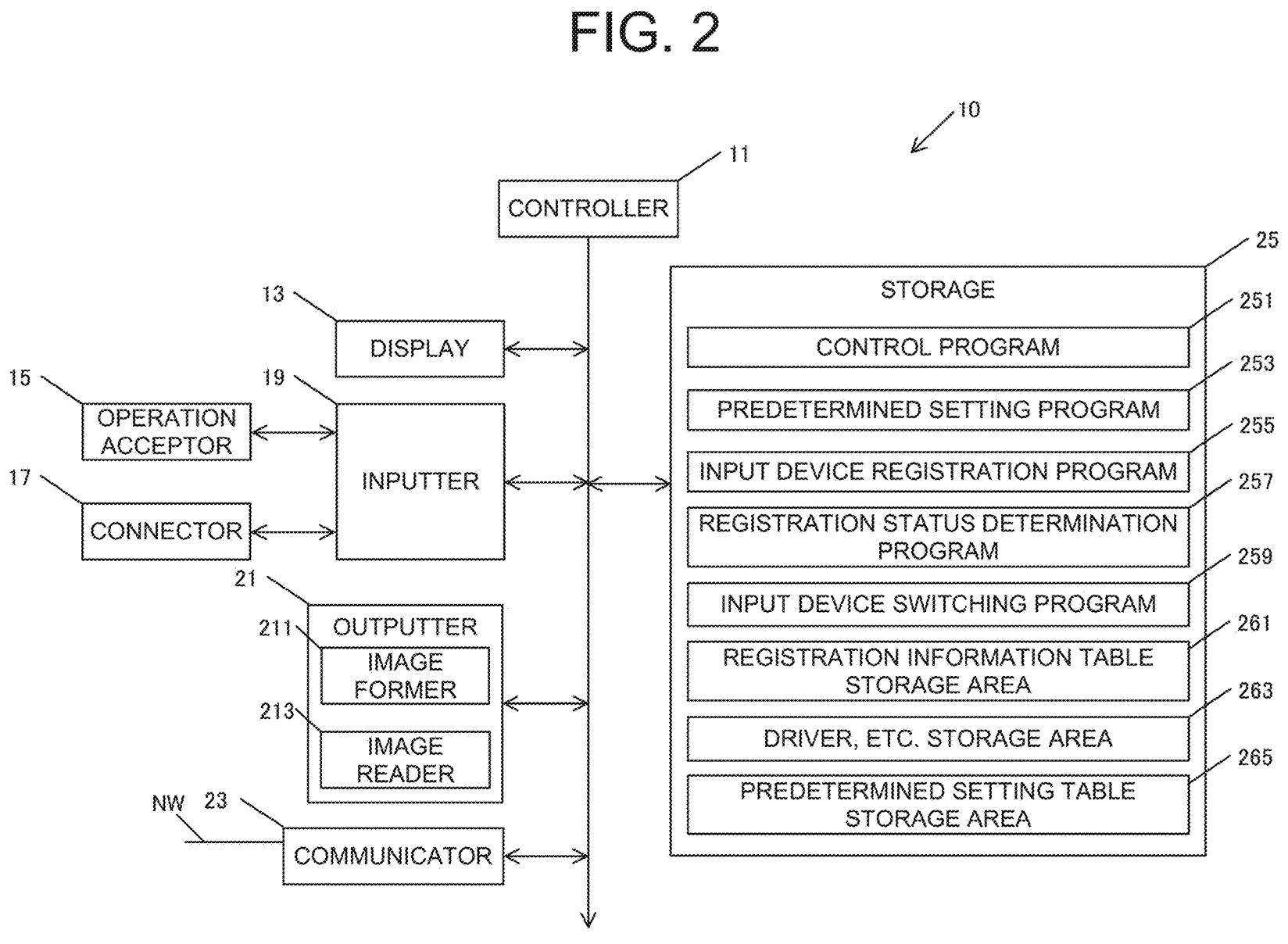

The configuration of the multifunction peripheral 10 according to the first embodiment will be described with reference to FIGS. 1 and 2. FIG. 1 is an external perspective view schematically illustrating an overall configuration of the multifunction peripheral 10. FIG. 2 is a diagram illustrating a functional configuration of the multifunction peripheral 10. The multifunction peripheral 10 includes a controller 11, a display 13, an operation acceptor 15, a connector 17, an inputter 19, an outputter 21, a communicator 23, and a storage 25.

The controller 11 controls the overall multifunction peripheral 10. The controller 11 includes, for example, one or more arithmetic devices (such as central processing units (CPUs)). The controller 11 reads and executes various programs stored in the storage 25 to perform functions thereof.

The display 13 displays various types of information to a user, or the like. The display 13 may include, for example, a liquid crystal display (LCD) or an organic electro-luminescence (EL) display.

The operation acceptor 15 accepts input of information by the user, or the like. The operation acceptor 15 may include hardware keys (e.g., numeric keypad), buttons, and the like. The operation acceptor 15 may be configured as a touch panel that allows input via the display 13. When the operation acceptor 15 is configured as a touch panel that may display a software keyboard together with the display 13, typical methods such as resistive method, infrared method, electromagnetic induction method, and capacitive method may be used as the input method for the touch panel.

The connector 17 includes, for example, a connection connector compatible with the USB standard and connects a keyboard with a wired connection method compatible with the USB standard to the multifunction peripheral 10. The connector 17 has a hardware configuration that enables communications with a wireless connection method and is also connectable to keyboards and terminal devices such as cell phones and smartphones compatible with short-range wireless communication protocols such as Wi-Fi (registered trademark) and Bluetooth (registered trademark).

The inputter 19 accepts characters, commands, and the like, input by the operation acceptor 15 (software keyboard) or a keyboard connected via the connector 17. The inputter 19 includes a driver, controller, software, and the like, and functions as an interface for causing the connected keyboard, and the like, to function. For example, when a keyboard is connected via the connector 17, the inputter 19 refers to the device memory included in the keyboard to acquire device information such as device ID and key layout as descriptors. The acquired device information is used for a process to switch the input device by the controller 11 described below. The inputter 19 may switch the input device from which input of characters, commands, and the like, is accepted based on control by the controller 11.

The outputter 21 includes an image former 211 and an image reader 213. The image former 211 forms an image based on image data (image data generated by scanning a printed document or image data input from an external device) on paper, which is a recording medium, to be output. The image former 211 may include, for example, a laser printer using an electrophotographic system. In this case, the image former 211 forms images by using toners supplied from toner cartridges (not illustrated) corresponding to toner colors (e.g., cyan, magenta, yellow, and black).

The image reader 213 scans and reads a printed document (document image), which is the target to be read, and thus generates and outputs image data. The image reader 213 may be configured as a scanner device including an image sensor such as a charge coupled device (CCD) or a contact image sensor (CIS). There are no restrictions on the configuration as long as the image reader 213 has a configuration to read a reflected light image from the printed document with an image sensor and thus output the image data.

The communicator 23 includes either one or both of wired and wireless interfaces for communications with other devices via a network NW, such as local area network (LAN), wide area network (WAN), the Internet, telephone line, or fax line. When a keyboard with a wireless connection method, a terminal device, or the like, is connected to the multifunction peripheral 10, the communicator 23 may perform the connection function (communication function) that is performed by the connector 17.

The storage 25 stores various programs and various types of data needed for the operation of the multifunction peripheral 10.

The storage 25 may include storage devices such as a random access memory (RAM), a hard disk drive (HDD), a solid-state drive (SSD), and a read only memory (ROM).

According to the first embodiment, the storage 25 stores a control program 251, a predetermined setting program 253, an input device registration program 255, a registration status determination program 257, and an input device switching program 259 and obtains a registration information table storage area 261, a driver, etc. storage area 263, and a predetermined setting table storage area 265.

The control program 251 is a program read by the controller 11 to comprehensively control the overall multifunction peripheral 10. The controller 11, which has read the control program 251, may control the display 13, the operation acceptor 15, the connector 17, the inputter 19, the outputter 21, the communicator 23, and the like, to execute jobs related to a copy mode, scan mode, fax mode, and the like.

The predetermined setting program 253 is a program read by the controller 11 to set the keyboard as an input device to be connected to the multifunction peripheral 10 to be used. The controller 11, which has read the predetermined setting program 253, accepts, as a predetermined setting, the priority order of the keyboard to be connected to the multifunction peripheral 10 to be used. The controller 11 stores the priority order accepted as a predetermined setting in a predetermined setting table. According to the present disclosure, the keyboard set by the controller 11 as a first input device based on the predetermined setting is referred to as a first keyboard.

The input device registration program 255 is a program read by the controller 11 to register a keyboard in the multifunction peripheral 10. The controller 11, which has read the input device registration program 255, accepts the registration information on the keyboard that is to be connected to the multifunction peripheral 10 to be used via a registration screen described below. The controller 11 stores the accepted registration information on the keyboard in the registration information table. According to the present disclosure, the act of storing the registration information in the registration information table may be referred to as registration. A second keyboard is selected from the keyboards whose registration information is registered in the registration information table.

The registration status determination program 257 is a program read by the controller 11 to determine the registration status of the keyboard connected via the connector 17. The controller 11, which has read the registration status determination program 257, acquires device information from the connected keyboard and determines whether the registration information on the keyboard related to the acquired device information is registered as a registration information table in the registration information table storage area 261 to thus determine the registration status of the keyboard.

The input device switching program 259 is a program read by the controller 11 to switch the input device for the multifunction peripheral 10. The controller 11, which has read the input device switching program 259, switches the keyboard from which input of characters, commands, and the like, is accepted based on the registration status of the connected keyboard. The controller 11, which has read the input device switching program 259, performs an operation to switch the keyboard again when a predetermined condition is satisfied after switching the keyboard.

The registration information table storage area 261 is a storage area where the controller 11, which has read the input device registration program 255, stores the registration information on the keyboard accepted via the registration screen described below as a registration information table. The registration information table to be stored in the registration information table storage area 261 will be described here.

FIG. 3 is a table illustrating an example of a structure of the registration information table. The registration information table includes registration ID, device ID, key layout, keyboard type, and communication type as registration items.

The registration ID is an identifier for uniquely identifying the keyboard to be registered in the multifunction peripheral 10, and any registration ID may be assigned. The device ID indicates the device ID of the keyboard, and the key layout indicates the key layout of the keyboard. The keyboard type indicates whether the type of the keyboard is a hardware keyboard or a software keyboard, and the communication type indicates whether the communication type of the keyboard is a wired connection method or a wireless connection method.

For example, it is indicated that the keyboard related to the registration ID "#001" has the device ID of "ggghhhiii", the key layout of "106/QWERTY", the keyboard type of "hardware (keyboard)", and the communication type of "wireless". The registration items and their registration values in the registration information table of FIG. 3 are merely examples, and the contents of the registration information table are not limited to those described in FIG. 3.

The driver, etc. storage area 263 is a storage area that stores a driver, software, etc. for functioning the keyboard connected via the connector 17 in the inputter 19. The inputter 19 may read the driver and the software stored in the driver, etc. storage area 263 to accept input of characters, commands, and the like, via the keyboard. A configuration may be such that the driver, software, etc. stored in the driver, etc. storage area 263 is automatically acquired from the connected keyboard, downloaded via a network, or installed from a storage medium such as CD-ROM.

The predetermined setting table storage area 265 is a storage area that stores the keyboards used in the multifunction peripheral 10 as a predetermined setting table with a priority order. The predetermined setting table stored in the predetermined setting table storage area 265 will be described here.

FIG. 4 is a table illustrating an example of a structure of the predetermined setting table. The predetermined setting table includes priority order, device ID, key layout, and keyboard type as registration items.

The priority order defines the priority order of the keyboards used in the multifunction peripheral 10. When the priority order is set for the keyboard to be used, in principle, the controller 11 sets the keyboard to be used in accordance with the priority order as the first keyboard from which input of characters, commands, and the like, is accepted. The device ID indicates the device ID of the keyboard, and the key layout indicates the key layout of the keyboard. The keyboard type indicates whether the type of the keyboard is a hardware keyboard or a software keyboard.

For example, in the example of FIG. 4, the priority order "01" is set for the keyboard with the device ID "aaabbbccc". When the keyboard related to the device ID "aaabbbccc" is connected to the multifunction peripheral 10, the controller 11 sets the keyboard as the first keyboard from which input of characters, commands, and the like, is accepted.

Conversely, when the keyboard with the device ID "aaabbbccc" is not connected to the multifunction peripheral 10, the controller 11 sets the software keyboard built in the multifunction peripheral 10 with the priority order "02" as the first keyboard from which input of characters, commands, and the like, is accepted. Specifically, when the keyboard with the device ID "aaabbbccc" is not connected, the controller 11 accepts characters, commands, and the like, input via the built-in software keyboard.

1.2 Process Flow

Figure 5:
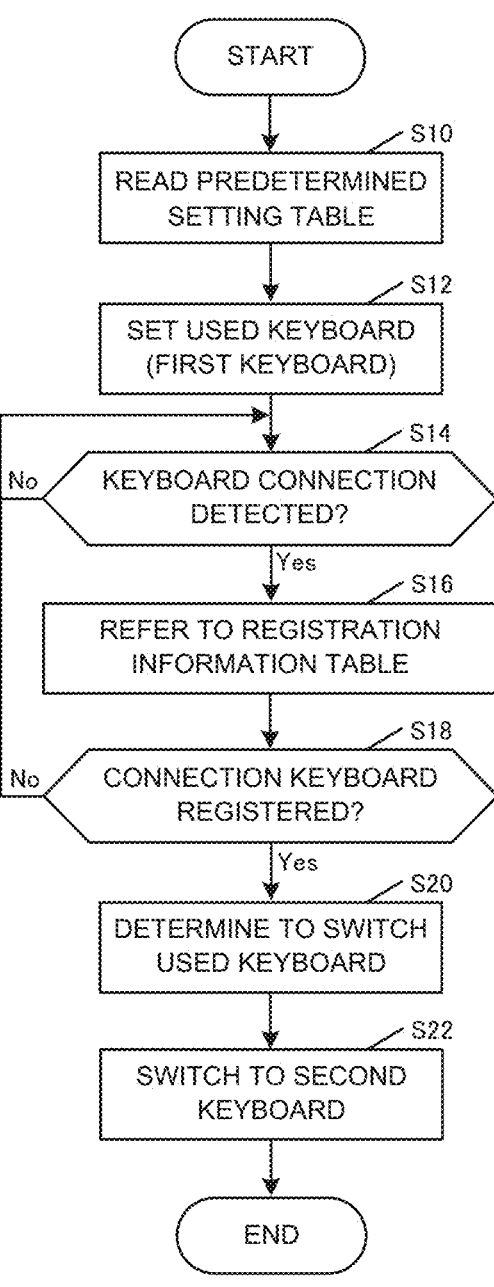
FIG. 5 is a flowchart illustrating a process flow according to the first embodiment.
Figure 6:
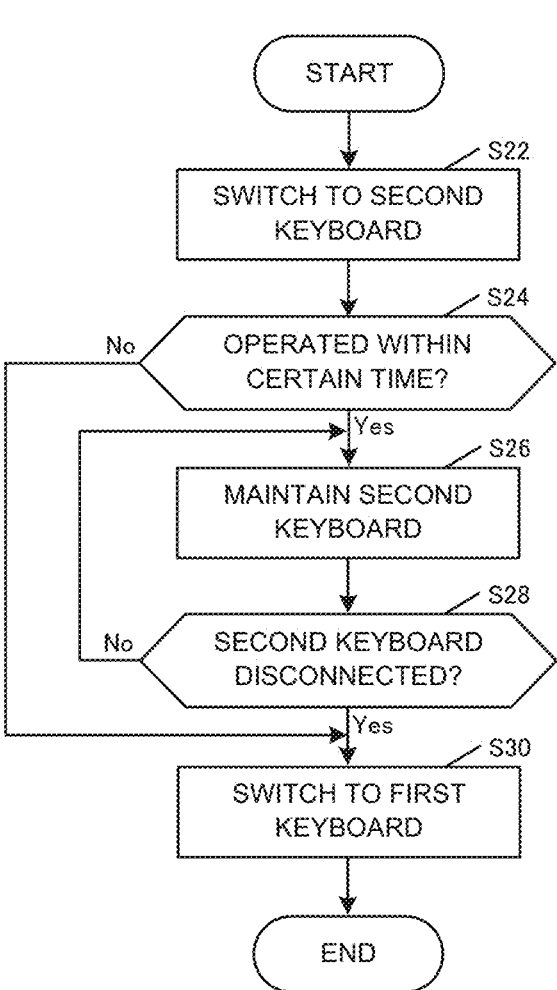
FIG. 6 is a flowchart illustrating a process flow according to the first embodiment.

Next, a process flow according to the first embodiment will be described. FIG. 5 is a flowchart illustrating the process from setting of the keyboard used in the multifunction peripheral 10 based on the predetermined setting to switching of the keyboard. FIG. 6 is a flowchart illustrating the process after keyboard switching. To perform the processes described in FIGS. 5 and 6, the controller 11 reads the control program 251, the registration status determination program 257, the input device switching program 259, and the like.

First, the controller 11 reads the predetermined setting table illustrated in FIG. 4 from the predetermined setting table storage area 265 (Step S10).

The controller 11 determines the first keyboard from which input of characters, commands, and the like, is accepted based on the read predetermined setting table (the input device from which input of characters, commands, and the like, is accepted via the inputter 19 is hereinafter referred to as the used keyboard) (Step S12).

Subsequently, the controller 11 monitors the connector 17 to determine whether the connection of the keyboard has been detected (Step S14). When it is determined that the connection of the keyboard has been detected, the controller 11 refers to the registration information table (Step S14; Yes→Step S16). When it is determined that no connection of the keyboard has been detected, the controller 11 maintains the used keyboard (the first keyboard) set in Step S12 and waits until the connection of the keyboard is detected (Step S14; No).

The controller 11 checks whether the registration information on the connected keyboard is registered as a registration information table in the registration information table storage area 261 to thus determine the registration status of the connected keyboard (Step S18). When it is determined that the connected keyboard is registered, the controller 11 determines to switch the first keyboard set as the used keyboard based on the predetermined setting to the connected second keyboard as the used keyboard (Step S18; Yes→Step S20).

The controller 11 then switches the used keyboard to the second keyboard and ends the process (Step S22).

Conversely, when it is determined that the registration information on the connected keyboard is not registered, the controller 11 returns the process to Step S14 and waits until the keyboard is connected (Step S18; No→Step S14).

Next, an example of the process after switching to the second keyboard as the used keyboard will be described with reference to FIG. 6.

After switching to the second keyboard in Step S22 of FIG. 5, the controller 11 determines whether the user has operated the second keyboard within a certain time (Step S24).

When it is determined that the user has operated the second keyboard within the certain time, the controller 11 maintains the second keyboard as the used keyboard (Step S24; Yes→Step S26). Conversely, when it is determined that the user has not operated the second keyboard within the certain time, the controller 11 switches the used keyboard from the second keyboard to the first keyboard (Step S24; No→Step S30).

Here, the certain time may be set to any time such as 30 seconds, 1 minute, 5 minutes, 10 minutes, or 1 hour after switching to the second keyboard. The reason why no user operation has been performed for the certain time after switching to the second keyboard may be that the user carrying the keyboard registered in the multifunction peripheral 10 has accidentally approached the multifunction peripheral 10 even though the user has no intention to use the multifunction peripheral 10. Assuming such a situation, according to the first embodiment, even when the used keyboard is accidentally switched to the second keyboard, the second keyboard is disconnected on the condition that there is no user operation on the second keyboard within the certain time, so that the used keyboard may be switched to the first keyboard without affecting other users' use.

The controller 11 then determines whether the second keyboard has been disconnected from the state where the second keyboard is maintained as the used keyboard. For example, when the user of the second keyboard moves away from the multifunction peripheral 10 and is located out of the wireless connection area, the controller 11 may determine that the second keyboard has been disconnected.

When it is determined that the second keyboard has been disconnected, the controller 11 switches the used keyboard to the first keyboard and ends the process (Step S28; Yes→Step S30). Conversely, when it is determined that the second keyboard has not been disconnected, the controller 11 maintains the second keyboard as the used keyboard (Step S28; No→Step S26).

A configuration may be such that, instead of switching the used keyboard to the first keyboard immediately after determining that the second keyboard has been disconnected, the controller 11 may switch the used keyboard to the first keyboard when the reconnection of the second keyboard has not been confirmed before a certain time elapses, such as 30 seconds, 1 minute, 5 minutes, 10 minutes, or 1 hour. Thus, by allowing the certain time before switching to the first keyboard, the user may continuously use the second keyboard even when the user of the second keyboard unintentionally moves away from the multifunction peripheral 10 (is located out of the wireless connection area).

1.3 Operation Example

Figure 7:
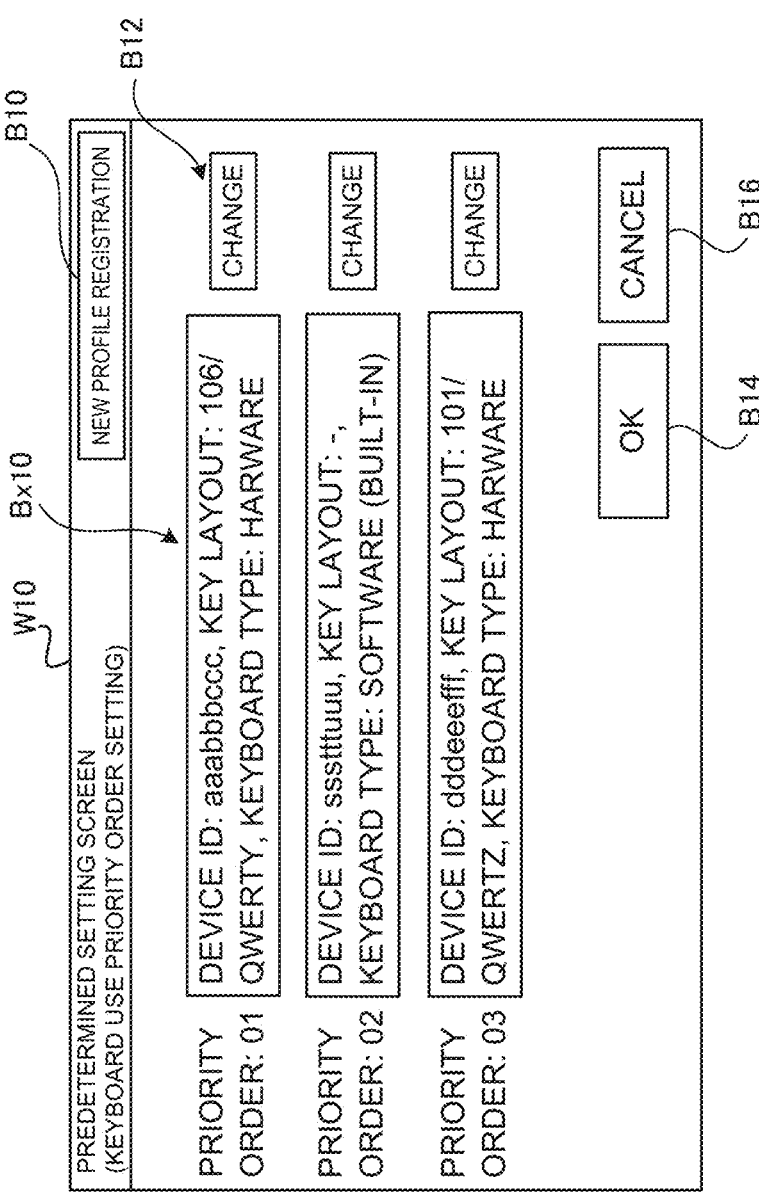
FIG. 7 is a diagram illustrating an operation example according to the first embodiment.

Next, an operation example according to the first embodiment will be described. FIG. 7 is a diagram illustrating an example of the configuration of a setting screen W10 that accepts predetermined settings of keyboards.

The setting screen W10 includes a keyboard information input box Bx10, a new profile registration button B10, a change button B12, an OK button B14, and a cancel button B16.

The keyboard information input box Bx10 is an input box that accepts input of the identification information on the keyboard for which the priority order is set. FIG. 7 illustrates an example where the device ID, key layout, and keyboard type are input items for the keyboard information input box Bx10, but it is of course possible to use only the device ID, for example, as an input item as long as the keyboard, for which the priority order is set, may be uniquely identified.

The new profile registration button B10 is a button that accepts the registration of a new profile related to the use priority order of the keyboard. FIG. 7 illustrates an example of the profiles in which the hardware keyboard associated with the device ID: aaabbbccc is set as the keyboard with the highest use priority order (priority order: 01), the software keyboard (built-in) associated with the device ID: sssttuuu is set as the keyboard with the second highest use priority order (priority order: 02), and the hardware keyboard associated with the device ID: dddeeefff is set as the keyboard with the third highest use priority order (priority order: 03), but a new profile different from the example in FIG. 7 may be set and registered by selecting the new profile registration button B10.

The change button B12 is a button that accepts an instruction for changing the input content in the keyboard information input box Bx10. The user may select the change button B12 to change the input content of the keyboard information input box Bx10.

The OK button B14 is a button that accepts an instruction for confirming the input content via the setting screen W10, and the cancel button B16 is a button that accepts an instruction for cancelling the input content via the setting screen W10.

Figure 8:
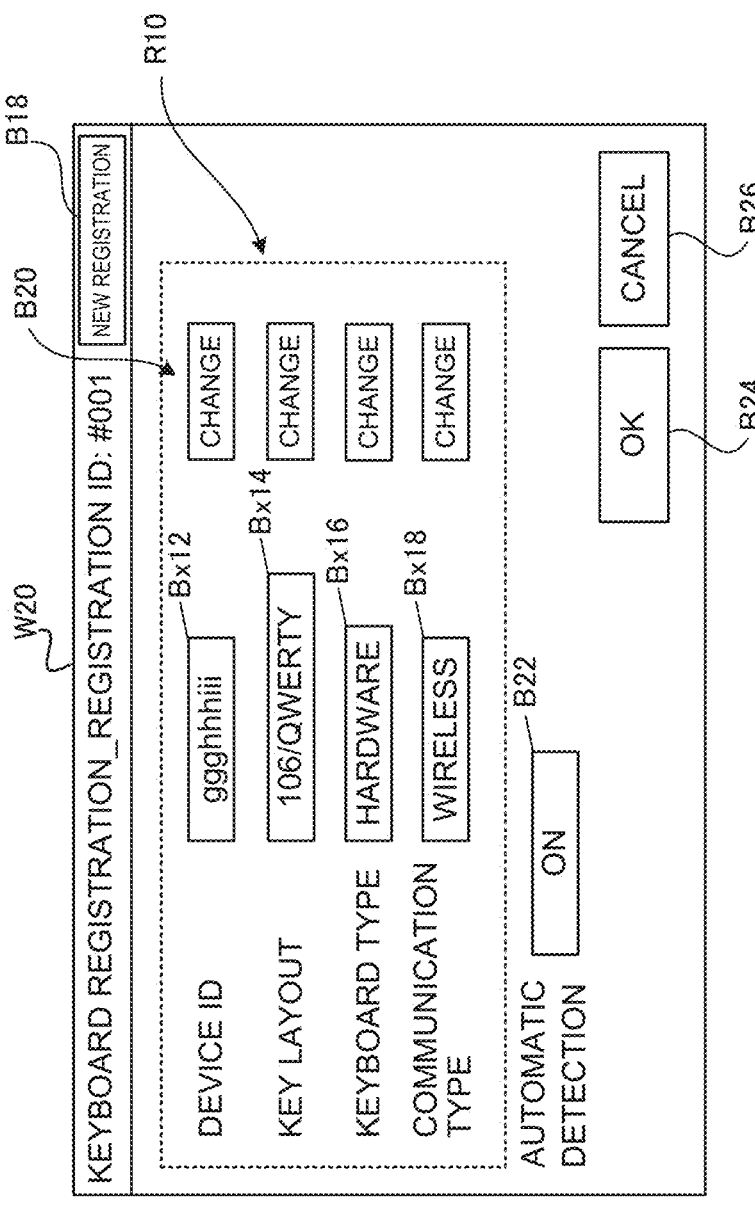
FIG. 8 is a diagram illustrating an operation example according to the first embodiment.

FIG. 8 is a diagram illustrating an example of the configuration of a registration screen W20 that accepts registration information on the keyboard.

The registration screen W20 includes a registration information input area R10, a new registration button B18, a change button B20, an automatic detection button B22, an OK button B24, and a cancel button B26.

The registration information input area R10 is an area that accepts input of the registration information on the keyboard. The registration information input area R10 includes a device ID input box Bx12, a key layout input box Bx14, a keyboard type input box Bx16, and a communication type input box Bx18. The device ID input box Bx12 accepts input of the device ID of the keyboard to be registered. The key layout input box Bx14 accepts input of the key layout of the keyboard to be registered. The keyboard type input box Bx16 accepts input of the keyboard type of the keyboard to be registered. The communication type input box Bx18 accepts input of the communication type of the keyboard to be registered. The information input via the registration information input area R10 is registered in the registration information table described in FIG. 3.

The new registration button B18 is a button that accepts new registration of the registration information on the keyboard.

The change button B20 is a button that accepts an instruction for changing the input content in the registration information input area R10. The user may select the change button B20 to change the input content in the registration information input area R10.

The automatic detection button B22 is a button that accepts automatic acquisition of the registration information related to the keyboard to be registered. When the automatic detection button B22 is selected while the desired keyboard to be registered is connected to the multifunction peripheral 10, the controller 11 controls the inputter 19, refers to the device memory included in the connected keyboard, and acquires the device information such as device ID and key layout as descriptors. The controller 11 then displays the acquired device information in the registration information input area R10.

The OK button B24 is a button that accepts an instruction for confirming the input content via the registration screen W20, and the cancel button B26 is a button that accepts an instruction for cancelling the input content via the registration screen W20.

FIGS. 9A, 9B, 10A, and 10B are diagrams schematically illustrating examples of the operation corresponding to the process from Step S14 to S22 in FIG. 5.

FIG. 9A illustrates the state where the hardware keyboard (the first keyboard) with the device ID "aaabbbccc" connected to the multifunction peripheral 10 is set as the used keyboard of the multifunction peripheral 10 based on the predetermined setting table. In the descriptions of FIGS. 9A to 10B, the state illustrated in FIG. 9A is the default state. For convenience of explanation, the hardware keyboard using a wireless connection method as the communication type is described as an example of the second keyboard whose registration information is registered. In the description, it is assumed that the area indicated in the dotted line frame in the figure is the wireless keyboard detection area.

FIG. 9B illustrates the state where the controller 11 has switched the used keyboard to the hardware keyboard (the second keyboard) (registration ID "#001" (see FIG. 3)) related to the device ID "ggghhhiii" after the hardware keyboard related to the device ID "ggghhhiii" is detected in the wireless keyboard detection area in the default state illustrated in FIG. 9A.

The registration information on the detected hardware keyboard related to the device ID "ggghhhiii" is registered as a registration information table in the registration information table storage area 261. Therefore, the controller 11 switches the used keyboard from the hardware keyboard (the first keyboard) with the device ID "aaabbbccc" to the hardware keyboard (the second keyboard) related to the device ID "ggghhhiii".

FIG. 10A illustrates the state where the controller 11 has switched (returned) the used keyboard from the hardware keyboard (the second keyboard) with the device ID "ggghhhiii" to the hardware keyboard (the first keyboard) with the device ID "aaabbbccc" as a result of detection failure of the hardware keyboard with the device ID "ggghhhiii" in the wireless keyboard detection area.

When the hardware keyboard (the second keyboard) related to the device ID "ggghhhiii" is not detectable in the wireless keyboard detection area, the controller 11 determines that the hardware keyboard (the first keyboard) with the device ID "aaabbbccc" connected to the multifunction peripheral 10 is the used keyboard of the multifunction peripheral 10 based on the predetermined setting table, and thus the state returns to the default state illustrated in FIG. 9A.

FIG. 10B illustrates the state where a hardware keyboard (device ID "aa1bb2cc3) with a wireless connection method for which no registration information is registered is detected in the wireless keyboard detection area in the state of FIG. 9B. In this case, the registration information on the hardware keyboard is not registered as a registration information table in the registration information table storage area 261. Therefore, the controller 11 maintains the hardware keyboard related to the device ID "ggghhhiii" as the used keyboard.

As described above, according to the first embodiment, even when the keyboard with a wireless connection method is detected in the wireless keyboard detection area, the detected keyboard is determined as the used keyboard of the processing device, such as the multifunction peripheral 10, only when the registration information on the keyboard is previously registered in the processing device so that, when the user desires to use the keyboard in the processing device, it is possible to provide the processing device by which the keyboard may be used without reducing the operability. Furthermore, in the configuration according to the first embodiment, when the keyboard with the wireless connection method registered in the processing device is no longer detected in the wireless keyboard detection area, the used keyboard is promptly switched to the keyboard set in the predetermined setting, which has the advantage of not reducing the operability of the user who conventionally uses the keyboard set in the predetermined setting as the primary used keyboard. According to the first embodiment, the keyboard with the wireless connection method registered in the processing device may be simply brought into the wireless keyboard detection area to be used as the used keyboard of the processing device so that it is possible to facilitate the use of the keyboards with wireless connection methods corresponding to various layouts and also improve the user convenience.

2 Second Embodiment

According to a second embodiment, when the registration information on the keyboard connected to the multifunction peripheral 10 is not registered, the user is inquired whether the keyboard may be registered.

2.1 Functional Configuration

The functional configuration of the multifunction peripheral 10 according to the second embodiment may be substantially identical to that of the multifunction peripheral 10 according to the first embodiment. The inquiry to the user as to whether the keyboard may be registered may be made by the controller 11 that has read the input device registration program 255 described according to the first embodiment.

2.2 Process Flow

Figure 11:
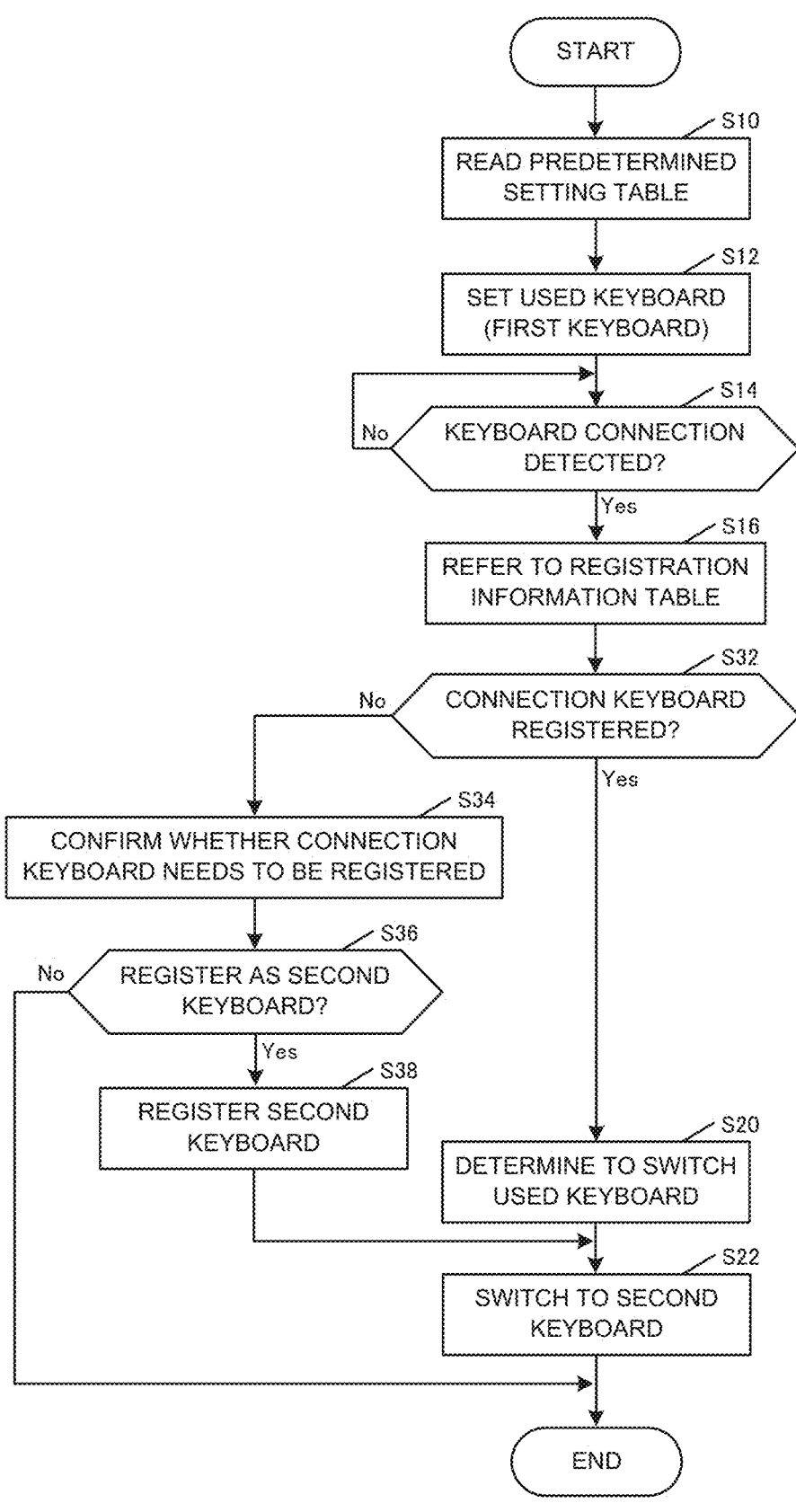
FIG. 11 is a flowchart illustrating a process flow according to a second embodiment.

Next, a process flow according to the second embodiment will be described. FIG. 11 is a flowchart illustrating the process to inquire of the user whether the keyboard may be registered when the registration information on the connected keyboard is not registered. The process from Steps S10 to S16, S20, and S22 in FIG. 11 may be the same as that described in FIG. 5, and therefore the same step numbers are used here and their descriptions are omitted.

The controller 11 checks whether the registration information on the connected keyboard is registered as a registration information table in the registration information table storage area 261 to determine the registration status of the connected keyboard (Step S32). When it is determined that the connected keyboard is registered, the controller 11 determines to switch the used keyboard, switches the used keyboard to the second keyboard, and ends the process (Step S32; Yes→Step S20→Step S22).

Conversely, when it is determined that the registration information on the connected keyboard is not registered, the controller 11 confirms with the user whether the connected keyboard (connection keyboard) needs to be registered as the second keyboard (Step S32; No→Step S34).

As a result of the confirmation as to whether the connection keyboard needs to be registered, when the user desires to register the keyboard and inputs the registration information on the keyboard via the registration screen described below, the controller 11 registers the keyboard as the second keyboard (Step S36; Yes→Step S38). When the user does not desire to register the keyboard, the controller 11 ends the process (Step S36; No→end).

2.3 Operation Example

Figure 12:
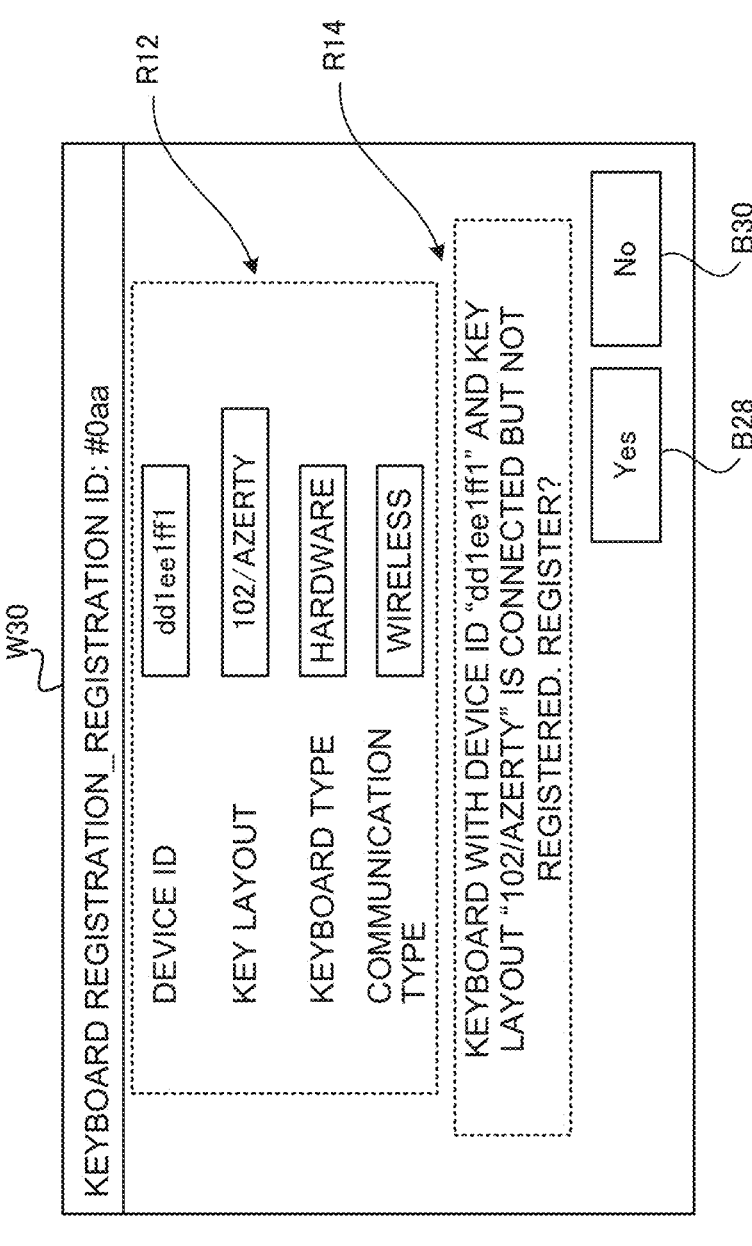
FIG. 12 is a diagram illustrating an operation example according to the second embodiment.

Next, an operation example according to the second embodiment will be described. FIG. 12 is a diagram illustrating an example of the configuration of a registration screen W30 that accepts the registration information on the connection keyboard.

The registration screen W30 may have substantially the same structure as that of the registration screen W20 illustrated in FIG. 8, but is different from the registration screen W20 in that a message display area R14 is included.

The registration screen W30 includes a connection keyboard information display area R12, the message display area R14, a Yes button B28, and a No button B30.

The connection keyboard information display area R12 displays the device information on the connection keyboard acquired via the inputter 19 as registration information. FIG. 12 illustrates the device ID, key layout, keyboard type, and communication type as registration items, as in FIG. 8.

The message display area R14 is an area that displays a message to the user inquiring whether to register the registration information of the connection keyboard. The message display area R14 displays the message such as "the keyboard with the device ID "dd1ee1ff1" and the key layout "102/AZERTY" is connected but not registered. Do you want to register?" to inquire of the user whether the connection keyboard needs to be registered.

The Yes button B28 is a button that accepts the user's instruction for registering the connection keyboard. The No button B30 is a button that accepts the user's instruction for rejecting the registration of the connection keyboard.

Figure 13:
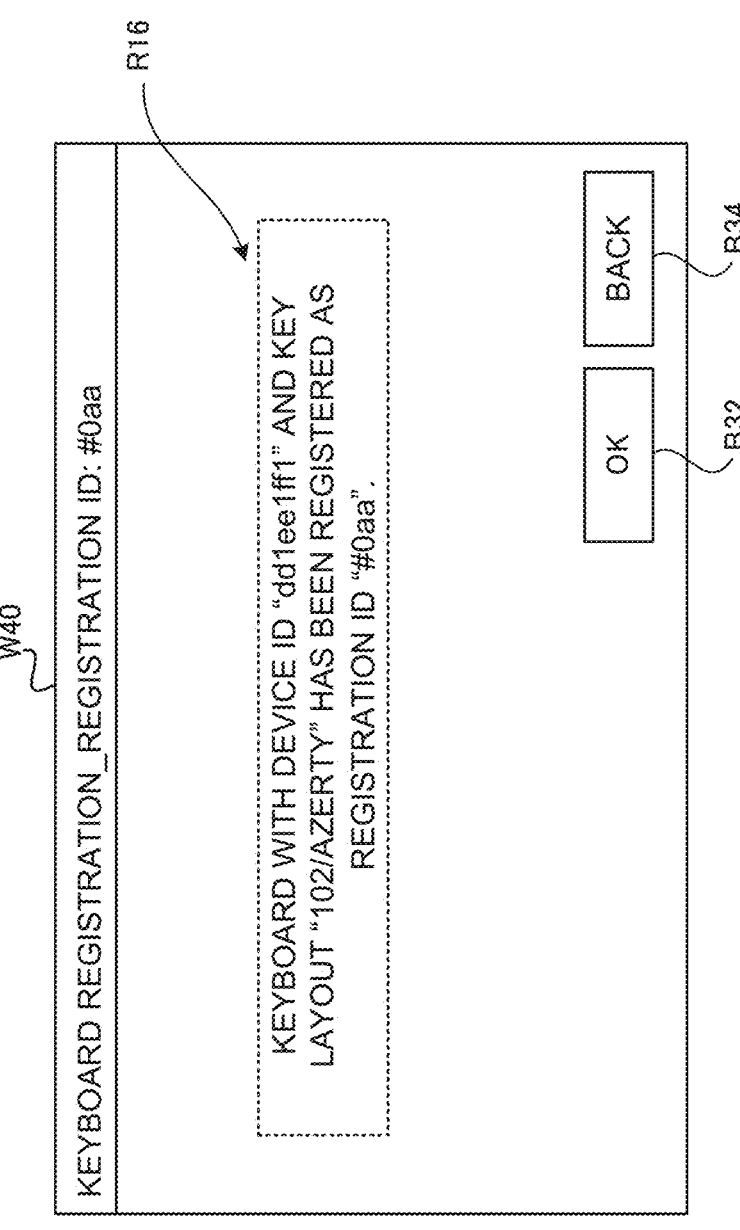
FIG. 13 is a diagram illustrating an operation example according to the second embodiment.

FIG. 13 is a diagram illustrating an example of the configuration of a registration confirmation screen W40 that is displayed by the controller 11 in response to the selection of the Yes button B28 on the registration screen W30 illustrated in FIG. 12.

When receiving the selection of the Yes button B28 on the registration screen W30, the controller 11 registers the registration information displayed on the registration screen W30 as a registration information table in the registration information table storage area 261. The controller 11 then displays in the message display area R16 that the connection keyboard has been registered.

FIG. 13 illustrates an example where the message display area R16 displays the message indicating that the registration of the connection keyboard has been completed, such as "the keyboard with the device ID "dd1ee1ff1" and the key layout "102/AZERTY" has been registered as the registration ID "#0aa"".

As described above, according to the second embodiment, in addition to the advantage according to the first embodiment, even when the registration information on the connected keyboard is not registered in the processing device, the user is inquired whether to register the registration information on the connection keyboard, and when the user desires to register the registration information, the registration information is registered in the processing device so that the registered connection keyboard may be used as the second keyboard.

3 Third Embodiment

According to a third embodiment, the registration information on the keyboard connected to the multifunction peripheral is registered when the number of connections of the keyboard exceeds a predetermined number, even if the registration information on the keyboard is not registered.

3.1 Functional Configuration

Figure 14:
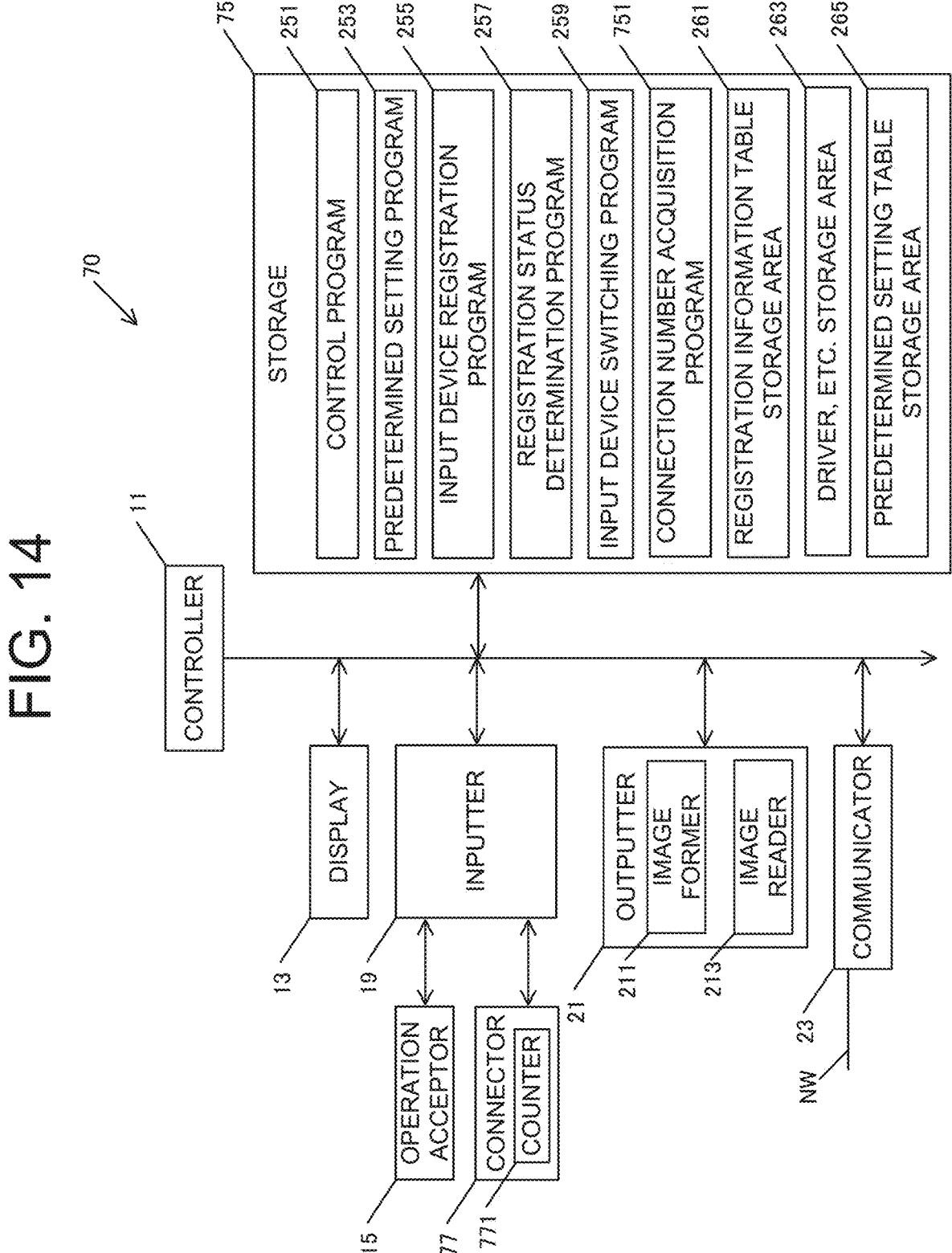
FIG. 14 is a diagram illustrating a functional configuration of a multifunction peripheral according to a third embodiment.

FIG. 14 is a diagram illustrating a functional configuration of a multifunction peripheral 70 according to the third embodiment. The functional configuration of the multifunction peripheral 70 may be substantially identical to that of the multifunction peripheral 10 according to the first embodiment. Therefore, the same components are denoted by the same reference marks and the descriptions thereof are omitted.

The multifunction peripheral 70 includes the controller 11, the display 13, the operation acceptor 15, a connector 77, the inputter 19, the outputter 21, the communicator 23, and a storage 75.

In addition to the configuration of the connector 17, the connector 77 includes a counter 771 that counts the number of connections of the keyboard. The counter 771 outputs the counted number of connections (count value) of the keyboard based on the instruction of the controller 11.

According to the third embodiment, the storage 75 stores the control program 251, the predetermined setting program 253, the input device registration program 255, the registration status determination program 257, the input device switching program 259, and a connection number acquisition program 751 and obtains the registration information table storage area 261, the driver, etc. storage area 263, and the predetermined setting table storage area 265.

The connection number acquisition program 751 is a program read by the controller 11 to acquire the number of connections of the keyboard. The controller 11, which has read the connection number acquisition program 751, acquires the number of connections (count value) of the keyboard from the counter 771 of the connector 77 when the registration information on the connected keyboard is not registered. Based on the count value acquired from the counter 771, the controller 11 determines whether the registration information on the keyboard may be registered.

3.2 Process Flow

Figure 15:
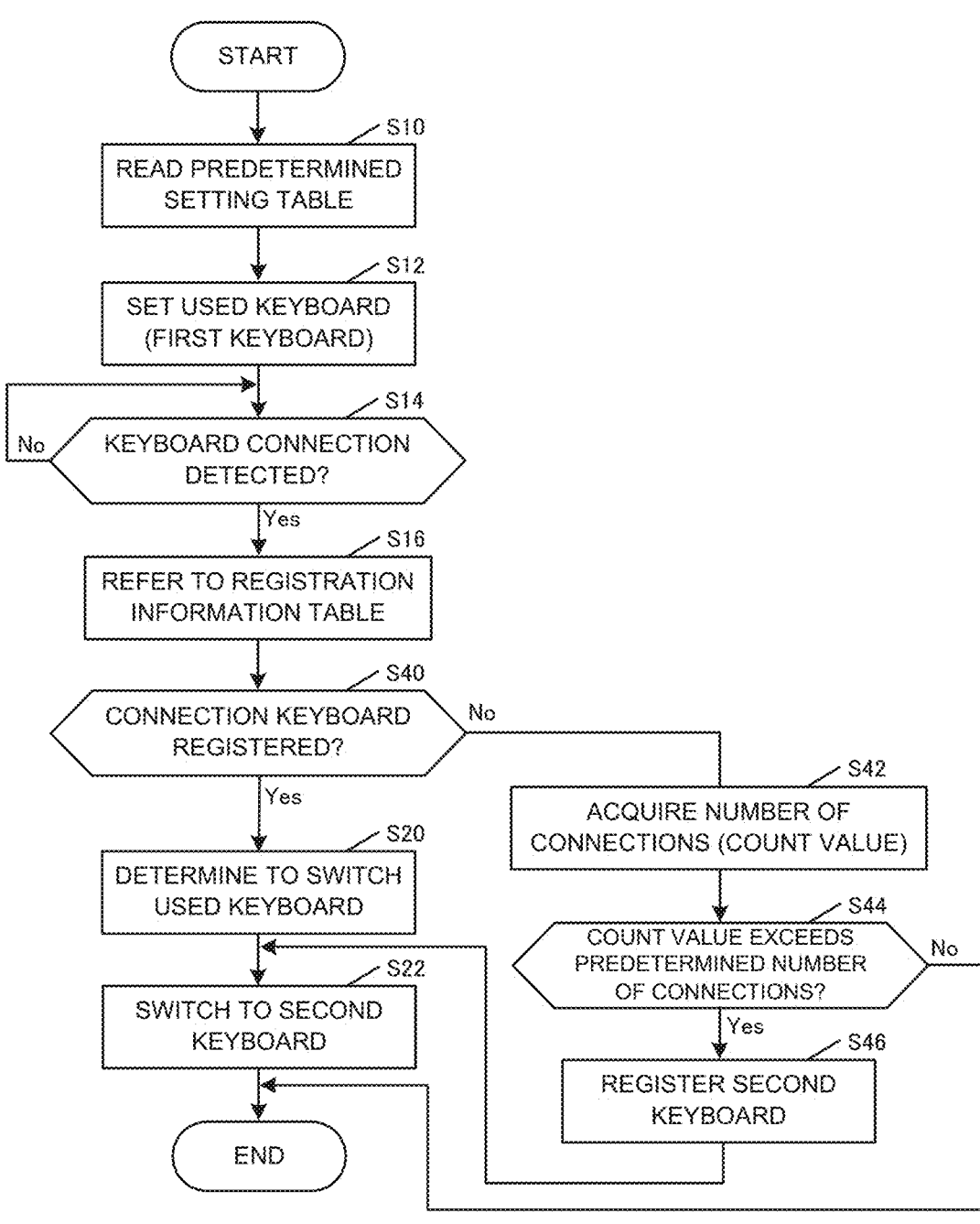
FIG. 15 is a flowchart illustrating a process flow according to the third embodiment.

Next, a process flow according to the third embodiment will be described. FIG. 15 is a flowchart illustrating the process to determine whether the registration information on the connected keyboard may be registered based on the number of connections of the keyboard to the multifunction peripheral 70 when the registration information is not registered. The process from Steps S10 to S16, S20, and S22 in FIG. 15 may be the same as that described in FIG. 5, and therefore the same step numbers are used here and their descriptions are omitted.

The controller 11 checks whether the registration information on the connected keyboard is registered as registration information in the registration information table storage area 261 to determine the registration status of the connected keyboard (Step S40). When it is determined that the connected keyboard is registered, the controller 11 determines to switch the used keyboard, switches the used keyboard to the second keyboard, and ends the process (Step S40; Yes→Step S20→Step S22).

Conversely, when it is determined that the registration information on the connected keyboard is not registered, the controller 11 acquires the number of connections (count value) of the connected keyboard from the counter 771 (Step S40; No→Step S42).

Subsequently, the controller 11 determines whether the count value acquired in Step S42 exceeds a predetermined number of connections (Step S44). Here, any number may be set as the predetermined number of connections. For example, when the predetermined number of connections is set to two, it is possible to prevent unnecessary registration of keyboards used by guest users who use the multifunction peripheral 70 only once.

The count value acquired from the counter 771 may have an expiration date. For example, even when the acquired count value exceeds the predetermined number of connections, a control is performed to invalidate the count value after the expiration date so that the number of registered keyboards may be limited and it is possible to prevent unnecessary burden on the storage capacity of the storage 75 by storing the registration information.

When it is determined that the count value acquired in Step S42 exceeds the predetermined number of connections, the controller 11 registers the keyboard as the second keyboard (Step S44; Yes→Step S46). In this case, in order to prevent registration that is not intended by the user, the controller 11 may display a confirmation message before registering the keyboard and register the keyboard as the second keyboard after obtaining user approval. In order to avoid a situation where the keyboard is registered as the second keyboard without the user's knowledge and the user is not able to grasp the registration status of the keyboard used by the user, it is also possible to have a configuration to give a notification to the user after the keyboard is registered. Conversely, when it is determined that the acquired count value does not exceed the predetermined number of connections, the controller 11 ends the process (Step S44; No→end).

As described above, according to the third embodiment, in addition to the advantage according to the first embodiment, even when the registration information on the connected keyboard is not registered, the registration information may be registered in accordance with the number of connections of the keyboard, and the registered connection keyboard may be used as the second keyboard.

4 Fourth Embodiment

A fourth embodiment is an embodiment of a terminal device that acquires screen information on a keyboard operating on a processing device such as a multifunction peripheral and generates an input screen corresponding to the keyboard based on the acquired screen information.

4.1 Functional Configuration

Figure 16:
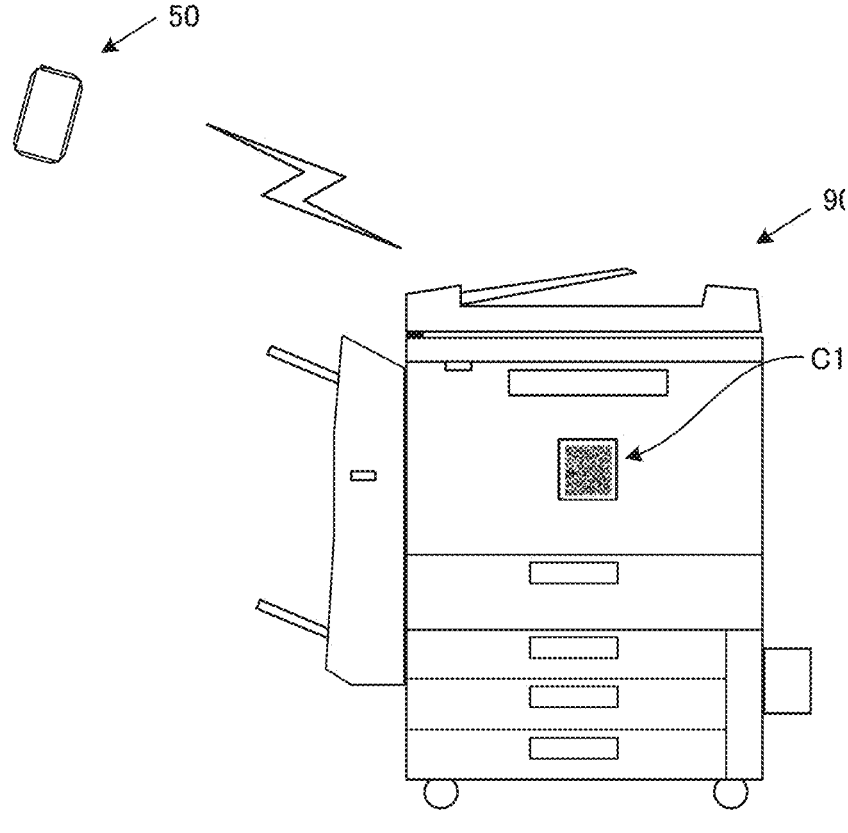
FIG. 16 is a diagram schematically illustrating the exchange of information between a terminal device and a multifunction peripheral according to a fourth embodiment.

FIG. 16 is a diagram schematically illustrating the exchange of information between a terminal device 50 and a multifunction peripheral 90 according to the fourth embodiment. The terminal device 50 according to the fourth embodiment is, for example, a terminal device that reads encoded information C10 (e.g., QR code (registered trademark)) obtained by encoding the screen information related to the keyboard operating in the multifunction peripheral 90 as a processing device to generate an input screen corresponding to the keyboard.

The terminal device 50 according to the fourth embodiment may be configured as what is called a mobile terminal device, such as smartphone, tablet, cellular phone, or laptop computer. The terminal device 50 is configured as a device that has the combination of at least the function of providing a (graphical) user interface, a function for communications, and a function unique to the mobile terminal device.

4.1.1 Configuration of Terminal Device 50

FIG. 17 is a diagram illustrating a functional configuration of the terminal device 50. The terminal device 50 includes a controller 51, a display 53, an operation inputter 55, a communicator 57, a short-range wireless communicator 59 and an imager/scanner 61 as acquirers, and a storage 63.

The controller 51 controls the overall terminal device 50. The controller 51 includes, for example, one or more arithmetic devices (CPU, etc.) and reads and executes various programs stored in the storage 63 to perform its functions.

The display 53 displays various types of information to the user or the like. The display 53 may include, for example, an LCD or organic EL display. The display 53 may display the input screen corresponding to the keyboard screen operating on the multifunction peripheral 90 based on the display control by the controller 51 that has read a display processing program 633.

The operation inputter 55 accepts input of information from the user or the like. The operation inputter 55 may be configured as a touch panel display that allows input via the display 53. In this case, for example, a resistive method, infrared method, electromagnetic induction method, or capacitive method may be used as the input method for the touch panel display.

The communicator 57 includes either one or both of wired and wireless interfaces for communications with other devices via a LAN, WAN, the Internet, telephone line, or the like.

The short-range wireless communicator 59 has no particular limitations on its configuration as long as short-range wireless communication protocols such as Wi-Fi (registered trademark), Bluetooth (registered trademark), infrared, NFC, and RFID may be used and the communications with other devices such as the multifunction peripheral 90 may be performed.

Examples of the imager/scanner 61 may include imaging devices, such as cameras, and scanning devices using laser light. There are no restrictions as long as the imager/scanner 61 has a configuration to acquire the screen information on the multifunction peripheral 90. It is also possible, of course, to use the short-range wireless communicator 59 as long as the configuration allows acquisition of the screen information on the multifunction peripheral 90.

The storage 63 stores various programs and various types of data needed for the operation of the terminal device 50. The storage 63 may include storage devices, such as RAM, HDD, SSD, and ROM.

According to the fourth embodiment, the storage 63 stores an application program 631, the display processing program 633, a screen information acquisition program 635, and a driver, etc. acquisition program 637 and obtains a screen information storage area 639.

The application program 631 is a program read by the controller 51 to execute various applications, such as phone calls, e-mails, fax, SNS, video and music viewing, and games.

The display processing program 633 is a program read by the controller 51 to display each application screen or the input screen corresponding to the keyboard screen operated by the multifunction peripheral 90.

The screen information acquisition program 635 is a program read by the controller 51 to acquire, from the multifunction peripheral 90, the screen information about the keyboard operating on the multifunction peripheral 90. The controller 51, which has read the screen information acquisition program 635, controls the short-range wireless communicator 59, the imager/scanner 61, and the like, to acquire the screen information from the multifunction peripheral 90.

The driver, etc. acquisition program 637 is a program read by the controller 51 to acquire a driver, software, etc. to function the input screen corresponding to the keyboard screen operating on the multifunction peripheral 90. The controller 51, which has read the driver, etc. acquisition program 637, controls the short-range wireless communicator 59, the imager/scanner 61, the communicator 57, or the like, to acquire drivers, software, etc. via the multifunction peripheral 90 and the network NW.

The screen information storage area 639 is a storage area that stores the screen information acquired by the controller 51 that has read the screen information acquisition program 635.

4.1.2 Configuration of Multifunction Peripheral 90

Figure 18:
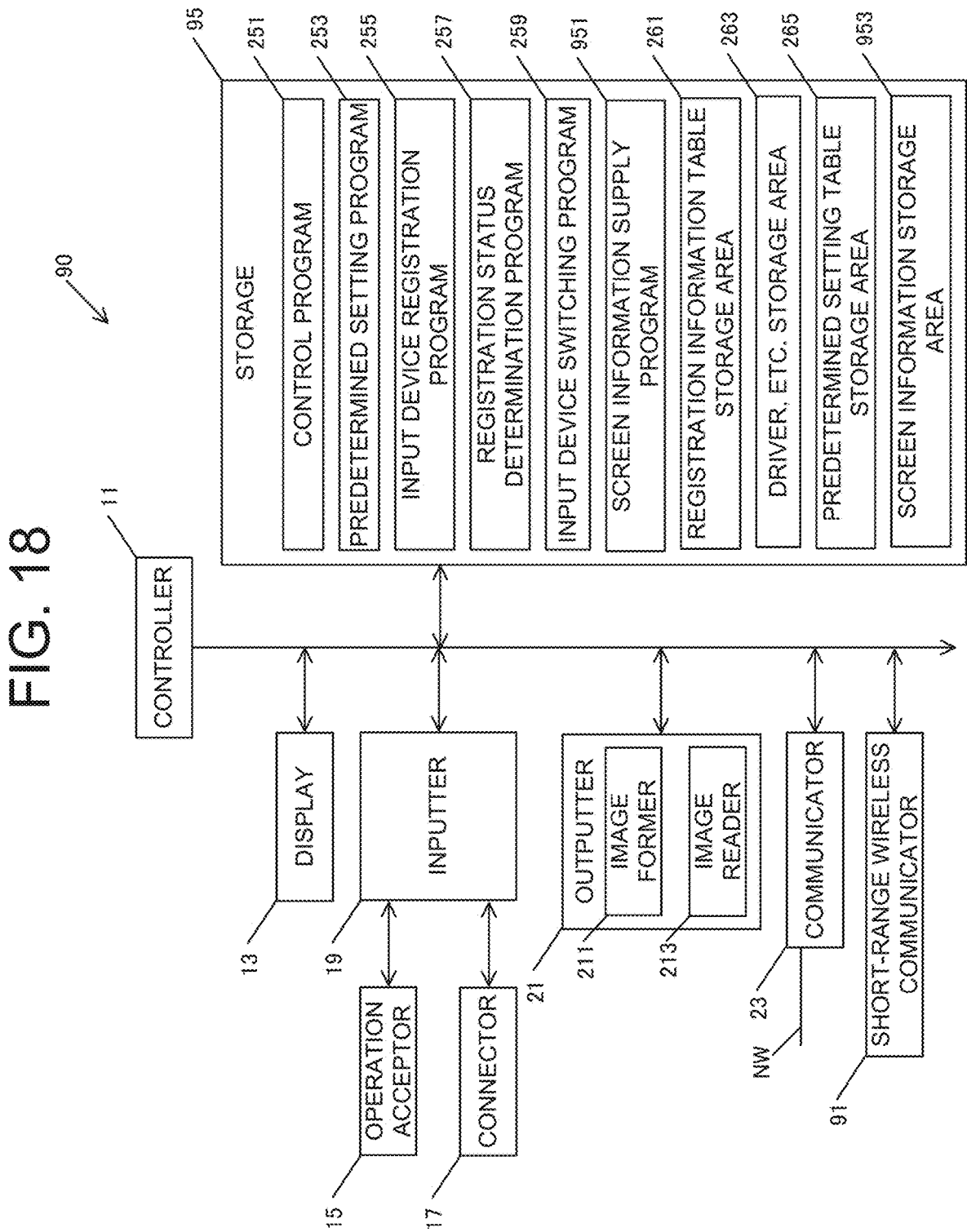
FIG. 18 is a diagram illustrating a functional configuration of a multifunction peripheral according to the fourth embodiment.

FIG. 18 is a diagram illustrating a functional configuration of the multifunction peripheral 90 according to the fourth embodiment. The functional configuration of the multifunction peripheral 90 may be substantially identical to that of the multifunction peripheral 10 according to the first embodiment. Therefore, the same components are denoted by the same reference marks and the descriptions thereof are omitted.

The multifunction peripheral 90 includes the controller 11, the display 13, the operation acceptor 15, the connector 17, the inputter 19, the outputter 21, the communicator 23, a short-range wireless communicator 91, and a storage 95.

The short-range wireless communicator 91 has no particular limitations on its configuration as long as short-range wireless communication protocols such as Wi-Fi (registered trademark), Bluetooth (registered trademark), infrared, NFC, and RFID may be used and the communications with other devices such as the terminal device 50 may be performed.

According to the fourth embodiment, the storage 95 stores the control program 251, the predetermined setting program 253, the input device registration program 255, the registration status determination program 257, the input device switching program 259, and a screen information supply program 951 and obtains the registration information table storage area 261, the driver, etc. storage area 263, the predetermined setting table storage area 265, and a screen information storage area 953.

The screen information supply program 951 is a program read by the controller 11 to supply the screen information about the software keyboard included in the multifunction peripheral 90. The controller 11, which has read the screen information supply program 951, generates control characters and the screen information including frame information, key layout information, and the like, needed to generate the input screen corresponding to the software keyboard as encoding information and characters (numbers, English characters, kana, hiragana, kanji, symbols, etc.). For example, when the generated information is encoded information, the information may be printed out on a recording sheet (e.g., sticker material) that may be fixed to a housing of the multifunction peripheral 90 and attached as encoded information C10 to the housing of the multifunction peripheral 90 as illustrated in FIG. 16. It is also possible to display the encoded information on the touch panel as the display 13 and the operation acceptor 15.

The encoded information to be generated may be a one-dimensional code such as a bar code (e.g., EAN code, JAN code, Codabar, or CODE128) or a two-dimensional code. The two-dimensional code may be a stacked two-dimensional code (e.g., PDF417, or CODE49) or a matrix two-dimensional code (e.g., a quick response code (QR code (registered trademark), DataMatrix, VeriCode, or Aztec).

The screen information storage area 953 is a storage area that stores the control characters, the screen information including the frame information and the key layout information, and the like. The controller 11, which has read the screen information supply program 951, generates encoded information and characters based on the screen information stored in the screen information storage area 953.

4.2 Process Flow

Figure 19:
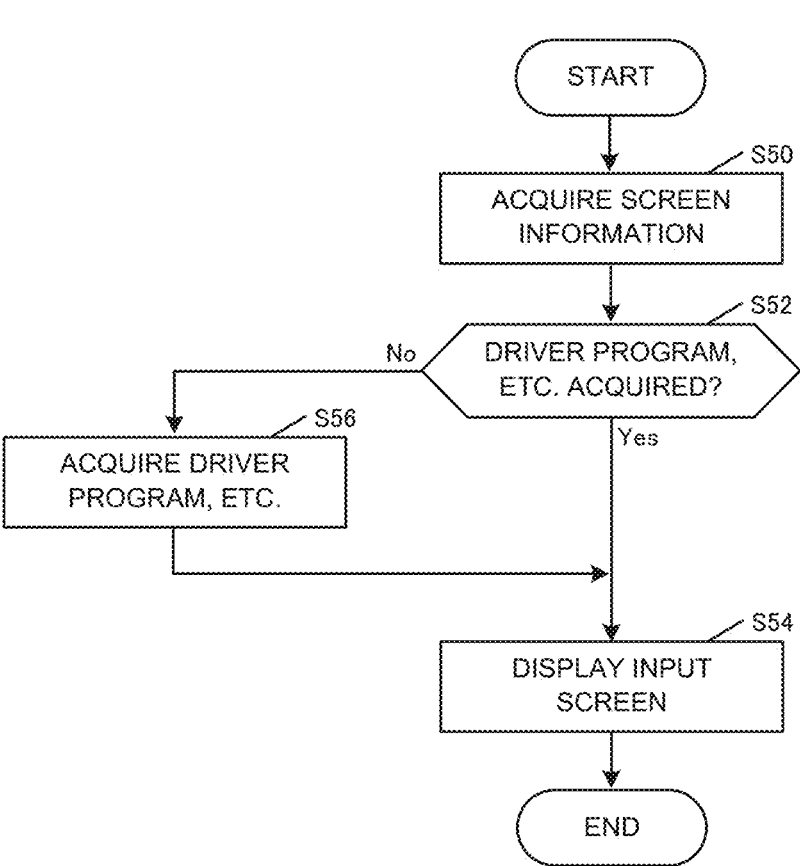
FIG. 19 is a flowchart illustrating a process flow according to the fourth embodiment.

Next, a process flow according to the fourth embodiment will be described. FIG. 19 is a flowchart illustrating the process from the acquisition of the screen information by the terminal device 50 to display of the input screen corresponding to the software keyboard included in the multifunction peripheral 90.

After reading the screen information acquisition program 635 based on the user's instruction, the controller 51 of the terminal device 50 controls the short-range wireless communicator 59, the imager/scanner 61, and the like, to acquire the screen information from the multifunction peripheral 90 (Step S50).

When the screen information is supplied as encoded information, the controller 51 decodes the encoded information acquired via the imager/scanner 61 to acquire screen information.

Subsequently, the controller 51 determines whether the driver, etc. has been acquired, which is needed to function the input screen to be generated based on the screen information acquired in Step S50 (Step S52). When it is determined that the driver, etc. has been acquired, the controller 51 generates the input screen based on the acquired screen information, displays the input screen on the display 53, and ends the process (Step S52; Yes→Step S54).

Conversely, when it is determined that the driver, etc. has not been acquired, the controller 51 reads the driver, etc. acquisition program 637 and acquires the needed driver, etc. (Step S52; No→Step S56). The controller 51 then generates the input screen based on the acquired screen information, displays the input screen on the display 53, and ends the process (Step S54).

4.3 Operation Example

Figure 20:
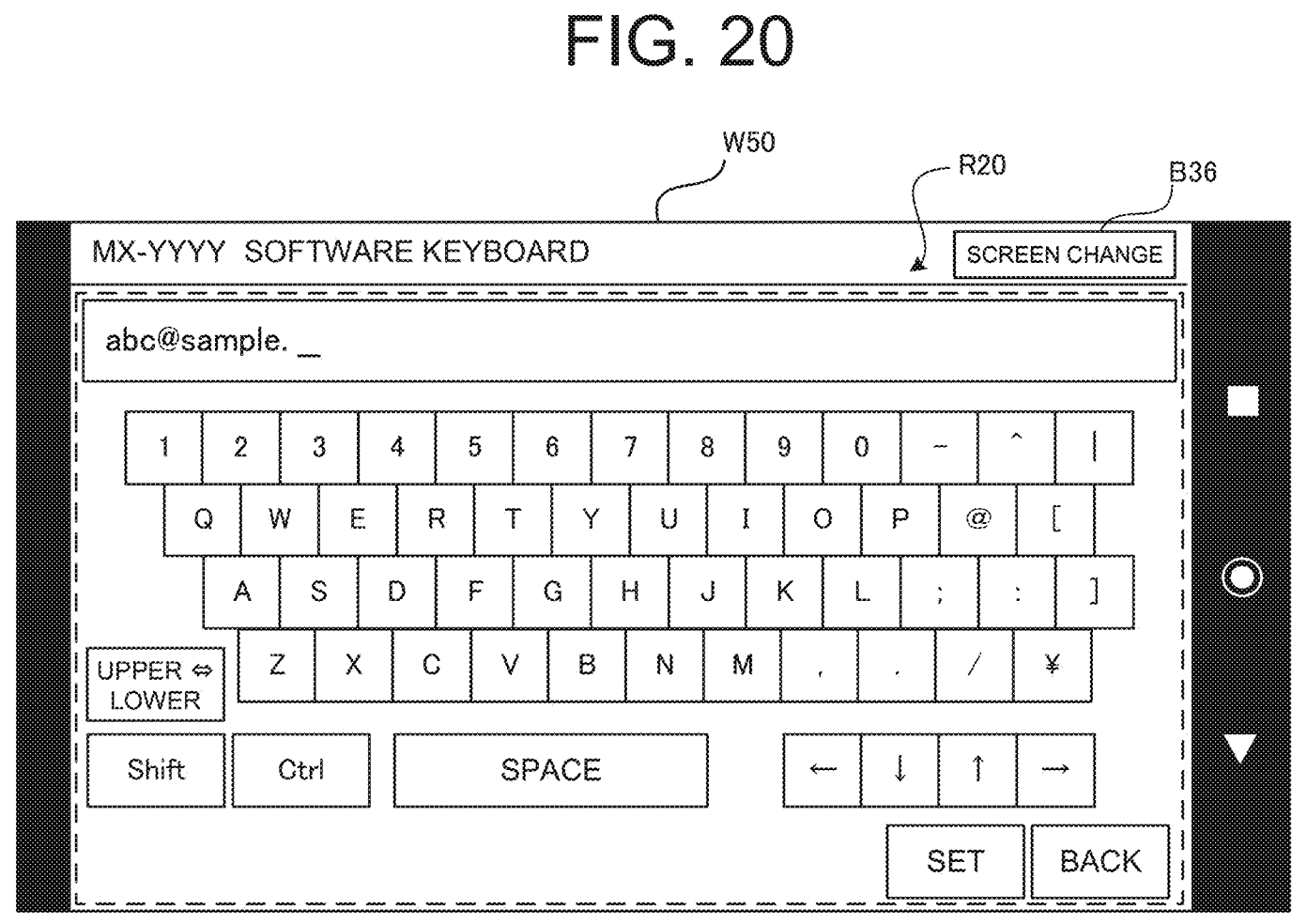

FIG. 20 illustrates an example of the configuration of an input screen W50 displayed on the display 53 of the terminal device 50. The input screen W50 has the configuration based on the key layout of the software keyboard operating on the multifunction peripheral 90 and may output characters, commands, and the like, input by the user to the multifunction peripheral 90.

The input screen W50 includes an input area R20 and a screen change button B36. The input area R20 includes various buttons that accept input of characters, commands, and the like, by the user and a display area that displays the input content. The user may input characters, and the like, while checking the content displayed in the display area. FIG. 20 illustrates an example where "abc@sample." is displayed in the display area as a character string in the process of input.

The screen change button B36 is a button that accepts input of a switching instruction for the input screen W50. For example, when the screen information related to a processing device other than the multifunction peripheral 90 has already been acquired and the user selects the screen change button B36, the controller 51 displays the input screen corresponding to the software keyboard included in the processing device whose screen information has been acquired.

FIG. 21 illustrates an example of the configuration of a setting screen W60 displayed when the multifunction peripheral 90 executes a specific job (Scan to E-mail) and illustrates the operation of inputting a character string using the input screen W50.

As illustrated in FIG. 21, the character string input by the user via the input screen W50 is output to the multifunction peripheral 90 and may be input as a destination address in a destination input field F10 of the setting screen W60, for example.

As described above, according to the fourth embodiment, the terminal device may display the input screen corresponding to the software keyboard included in the multifunction peripheral and output accepted characters, commands, and the like, to the multifunction peripheral. This configuration allows the user to configure the job settings for the multifunction peripheral by using the terminal device owned by himself/herself. According to the fourth embodiment, as there is no need for a dedicated application for job settings of the multifunction peripheral, it is possible to eliminate the time and effort involved in installing and operating the application. Furthermore, according to the fourth embodiment, it is possible to display and operate the input screen corresponding to the multifunction peripheral whose screen information has been acquired, and therefore the user may configure the job settings for a plurality of multifunction peripherals by using only the terminal device owned by himself/herself.

The present disclosure is not limited to the above-described embodiments, and various changes are possible. Specifically, the technical scope of the present disclosure also includes embodiments obtained by combining technical measures that are modified as appropriate without departing from the gist of the present disclosure.

Although some parts of the above-described embodiments are separately described for convenience of explanation, it is needless to say that the embodiments may be combined and implemented within a technically allowable range.

The program to be operated on each device according to the embodiment is a program that controls the CPU, or the like (a program that causes the computer to function) so as to perform the functions according to the above-described embodiments. According to the embodiment, it is assumed that the device simultaneously executes a plurality of programs as needed by multitask processing. The information handled by the devices is temporarily accumulated in a temporary storage device (e.g., RAM) during processing of the information, and then is stored in various storage devices such as a read-only memory (ROM) and an HDD, and is read, modified, and written by the CPU as needed.

Here, a recording medium that stores the program may be any of a semiconductor medium (e.g., a ROM or a non-volatile memory card), an optical recording medium/mag-neto-optical recording medium (e.g., a digital versatile disc (DVD), a magneto optical disc (MO), a mini disc (MD), a compact disc (CD), or a Blu-ray (registered trademark) disc (BD)), and a magnetic recording medium (e.g., a magnetic tape, or a flexible disc). The functions according to the above-described embodiments may be performed by execut-ing loaded programs, and also the functions according to the present disclosure may be performed by processing in cooperation with the operating system, other application programs, or the like, in accordance with the instructions of the programs.

For market distribution, the program may be stored and distributed in a portable recording medium or transferred to a server computer connected via a network such as the Internet. In this case, a storage device of the server computer is obviously included in the present disclosure.

What is claimed is:

1. A processing device comprising:
an inputter capable of accepting input by different input devices;
a storage that stores registration information of the input devices;
a controller capable of setting a first input device, based on a predetermined setting that is previously set, as an input device by which the input is accepted; and
a counter that counts a number of connections of a second input device to the processing device, wherein the controller:
in response to a connection of the second input device being established, determines whether the storage has stored registration information of the second input device,
switches the input device as the input device by which the input is accepted from the first input device to the second input device in a case that the registration information of the second input device is determined to be stored in the storage,
maintains the first input device as the input device by which the input is accepted in a case that the regis-tration information of the second input device is determined not to be stored in the storage, and
stores the registration information of the second input device in the storage when the number of connec-tions is greater than one.

2. The processing device according to claim 1, wherein the controller sets the first input device as the input device by which the input is accepted when there is no operation on the inputter before a certain time elapses after setting the second input device as the input device by which the input is accepted.

3. The processing device according to claim 1, wherein the controller sets the first input device as the input device by which the input is accepted when the second input device is disconnected.

4. The processing device according to claim 3, wherein the controller maintains the second input device as the input device by which the input is accepted when the connection of the second input device is detected before a certain time elapses after the second input device is disconnected.

5. The processing device according to claim 1, wherein the controller inquires from a user whether the registration information on the second input device is to be stored.

6. The processing device according to claim 1, wherein the predetermined setting includes a priority order for the input devices by which the input is accepted.

7. The processing device according to claim 1, wherein the input device comprises a hardware keyboard or a soft-ware keyboard.

8. The processing device according to claim 1, wherein, when the controller detects the connection of the second input device and determines that the storage has stored the registration information of the second input device, the controller, after switching the input device from the first input device to the second input device, disables the first input device.

9. A method for determining an input device, the method comprising:
accepting input by different input devices;
storing registration information of the input devices;
setting a first input device, based on a predetermined setting that is previously set, as the input device to be used for the input;
determining, in response to a connection of a second input device being established, whether registration informa-tion of the second input device is stored in a storage;
switching the input device as the input device to be used for the input from the first input device to the second input device in a case that the registration information of the second input device is determined to be stored in the storage;
maintaining the first input device as the input device by which the input is accepted in a case that the registra-tion information of the second input device is deter-mined not to be stored in the storage;
counting a number of connections of a second input device to the processing device; and
storing the registration information of the second input device in the storage when the number of connections is greater than one.

* * * * *